(12) United States Patent
Handa et al.

(10) Patent No.: US 6,376,043 B1
(45) Date of Patent: Apr. 23, 2002

(54) AROMATIC POLYAMIDE FILM LAMINATE, PRODUCTION PROCESS THEREOF AND MAGNETIC RECORDING MEDIUM THEREFROM

(75) Inventors: Makoto Handa; Mitsumasa Ono, both of Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/509,004

(22) PCT Filed: Jul. 21, 1999

(86) PCT No.: PCT/JP99/03895
§ 371 Date: Mar. 21, 2000
§ 102(e) Date: Mar. 21, 2000

(87) PCT Pub. No.: WO00/05070
PCT Pub. Date: Feb. 3, 2000

(30) Foreign Application Priority Data

| | | | |
|---|---|---|---|
| Jul. 21, 1998 | (JP) | | 10-205174 |
| Jul. 21, 1998 | (JP) | | 10-205175 |
| Aug. 11, 1998 | (JP) | | 10-226831 |
| Aug. 28, 1998 | (JP) | | 10-243011 |

(51) Int. Cl.⁷ .................................. G11B 5/73
(52) U.S. Cl. ............. 428/141; 428/213; 428/330; 428/337; 428/474.4; 428/694 ST; 428/694 SG; 428/900
(58) Field of Search ............. 428/141, 213, 428/330, 337, 474.7, 694 ST, 694 SG, 900

(56) References Cited

U.S. PATENT DOCUMENTS

| | | | | |
|---|---|---|---|---|
| 4,645,702 A | * | 2/1987 | Asakura et al. | 428/141 |
| 5,853,907 A | * | 12/1998 | Yamada et al. | 428/694 SG |
| 5,972,474 A | * | 10/1999 | Tsuzuki et al. | 428/141 |
| 5,993,938 A | * | 11/1999 | Tsukuda et al. | 428/141 |
| 5,997,987 A | * | 12/1999 | Koizumi et al. | 428/141 |
| 6,124,021 A | * | 9/2000 | Hanada | 428/141 |
| 6,180,254 B1 | * | 1/2001 | Handa et al. | 428/474.4 |

FOREIGN PATENT DOCUMENTS

| | | |
|---|---|---|
| JP | 52-39719 | 10/1977 |
| JP | 52-134706 | 11/1977 |
| JP | 53-32828 | 9/1978 |
| JP | 54-147010 | 11/1979 |
| JP | 56-162617 | 12/1981 |
| JP | 61-246919 | 11/1986 |
| JP | 1-247162 | 10/1989 |
| JP | 8-203064 | 8/1996 |
| JP | 8-225664 | 9/1996 |

\* cited by examiner

*Primary Examiner*—Stevan A. Resan
(74) *Attorney, Agent, or Firm*—Sughrue Mion, PLLC

(57) ABSTRACT

An aromatic polyamide film laminate comprising at least two biaxially oriented films formed of an aromatic polyamide, wherein (1) a film layer A, which is the outermost layer of the laminate, contains inorganic particles produced from hydroxides or carbonates of at least one metal of the groups Ia and IIa of the periodic table, the inorganic particles having an average particle diameter of 80 to 1,500 nm, and has a surface roughness ($Ra^A$) of 1 to 20 nm, and (2) a film layer B, which is the layer opposite to the layer A of the laminate, has a surface roughness ($Ra^B$) of 0.1 to 10 nm, (3) the surface roughness ($Ra^B$) of the film layer B being smaller than the surface roughness ($Ra^A$) of the film layer A by 1 nm or more. According to the present invention, there can be provided an aromatic polyamide film laminate suitable for use as a base film for a magnetic recording medium, which attains high abrasion resistance and high flatness at the same time while having excellent handling properties such as strength, slipperiness and winding property and which also exhibits excellent performance stability under a high-temperature and high-humidity environment; a production process therefor; and a metal-thin-film high-density magnetic recording medium and a multiple-coat high-density magnetic recording medium which have excellent electromagnetic conversion characteristics and are suitable for high-density recording by using the aromatic polyamide film laminate.

23 Claims, 1 Drawing Sheet

Figure 1:
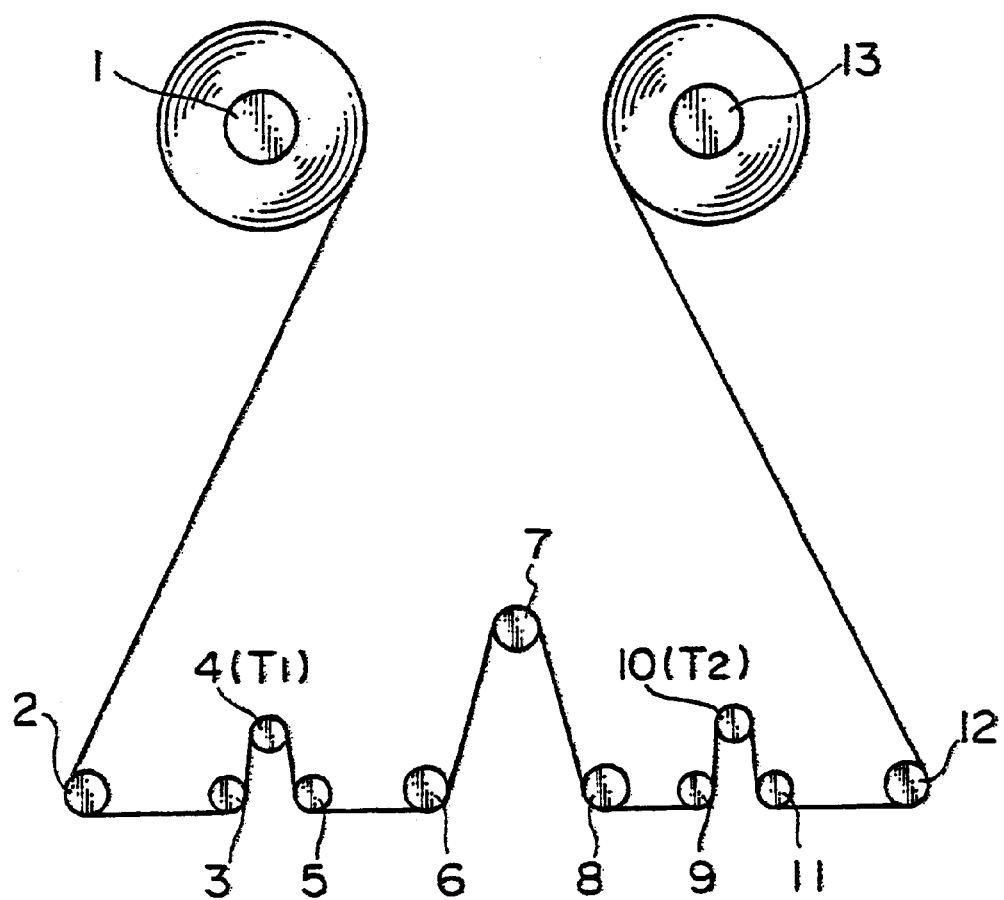

AROMATIC POLYAMIDE FILM LAMINATE, PRODUCTION PROCESS THEREOF AND MAGNETIC RECORDING MEDIUM THEREFROM

DETAILED DESCRIPTION OF THE INVENTION

1. Technical Field

The present invention relates to an aromatic polyamide film laminate suitable for use as a base film for magnetic recording media, a production process therefor and high-density magnetic recording media produced therefrom. More specifically, it relates to an aromatic polyamide film laminate which is excellent in handling properties such as strength, slipperiness and winding property, abrasion resistance, performance stability under a high-temperature and high-humidity environment, and running durability; a production process therefor; and high-density magnetic recording media produced therefrom.

2. Background Art

In recent years, remarkable progress has been made in high-density magnetic recording media, as exemplified by the development and implementation of a metal thin film magnetic recording medium in which a ferromagnetic metal thin film is formed on a non-magnetic substrate by a physical deposition method such as vacuum vapor deposition or sputtering, or a plating method, and a thin layer-coated magnetic recording medium in which a needle-shaped magnetic powder such as metal powder or iron oxide powder is coated on a film to a thickness of not larger than 2 μm. Known examples of the former include a Co-deposited tape (see JP-A 54-147010) and a vertical magnetic recording medium composed of Co—Cr alloy (see JP-A 52-134706). Known examples of the latter include an extremely thin layer-coated magnetic recording medium for high-density magnetic recording (see "Technical Report MR 94-78" (1995-02) issued by the Institute of Electronics and Communication Engineering of Japan).

Since a coated magnetic recording medium of the prior art (magnetic recording medium in which a mixture of magnetic powder and an organic polymer binder is coated on a non-magnetic substrate) has a low recording density and a long recording wavelength, the thickness of its magnetic layer is as large as 2 μm or more. On the other hand, a ferromagnetic metal thin film formed by thin film forming means such as vacuum vapor deposition, sputtering or ion plating has as extremely small a thickness as 0.2 μm or less. In the case of an extremely thin layer-coated medium, a coated magnetic layer is as extremely thin as 0.13 μm though a non-magnetic primary coat layer is provided.

In the above high-density magnetic recording media, the surface condition of the non-magnetic substrate (base film) has a great influence on the surface properties of the magnetic layer. Particularly, in the case of a metal thin film magnetic recording medium, the surface condition of the non-magnetic substrate is directly reflected on the surface of the magnetic layer (magnetic recording layer) as unevenness, which causes noise in recording and reproduction signals. Therefore, it is desirable that the surface of the non-magnetic substrate be as smooth as possible.

On the other hand, in view of the formation of the non-magnetic substrate (base film) and the handling properties such as scratching, winding and unwinding thereof in the film formation step, when the surface of the film is too smooth, slipperiness between films deteriorates, a blocking phenomenon occurs, the form of the rolled film (roll formation) is bad, with the result of a reduction in product yield and an increase in the production cost of a product. Therefore, from the viewpoint of production cost, it is desirable that the surface of the non-magnetic substrate (base film) be as rough as possible.

To attain both of the above characteristics on the surface of the base film which are antipodal to each other, it is necessary to form protrusions on the surface of the base film that have appropriate height and density derived from particles having optimized particle diameters.

As a method of forming protrusions on the surface of an aromatic polyamide film, there have been proposed (a) a method in which a predetermined amount of inorganic particles is added (JP-A 61-246919), (b) a method in which organic polymer particles or inorganic particles whose surfaces have been treated with organic polymers are added (JP-A 8-203064) have been proposed. However, it is difficult to attain flatness and handling properties at the same time by the above method of adding particles and the like to a single resin layer to form protrusions and, particularly, it is extremely difficult to avoid defects occurring at the time of winding up the film into a roll form as long as the method is used. To solve this problem, there has been proposed an aromatic polyamide film or aromatic polyimide film one surface of which has different surface roughness than the other and which is produced by laminating at least two resin layers (JP-A 1-247162). In this case, however, externally added particles, which are used to form protrusions, are liable to agglomerate in the slurry added, so that particles are fallen off from the protrusions by friction when a guide pin actually makes contact with the surface of the film, damaging the step. The film also has another defect that coarse protrusions on the surface which are derived from agglomerates of particles interfere with attaining surface flatness that provides excellent electromagnetic conversion characteristics when it is used for a high-density magnetic recording medium such as a metal thin film magnetic recording medium.

Further, an aromatic polyamide resin generates hydrogen chloride in its polymerization reaction, which must be neutralized. If the salt produced by the neutralization is not completely removed when a film is formed, for a metal thin film magnetic recording medium, the thin magnetic metal film is damaged particularly under a high-temperature and high-humidity environment, so that the film cannot maintain stable performance for a long time.

Problem to Be Solved By the Invention

It is the first object of the present invention to solve the problems of prior art and provide an aromatic polyamide film laminate suitable for use as a base film for a magnetic recording medium, which attains high abrasion resistance and high flatness at the same time while having excellent handling properties such as strength, slipperiness and winding property and which also exhibits excellent performance stability under a high-temperature and high-humidity environment, and a production process therefor.

It is the second object of the present invention to provide a metal-thin-film high-density magnetic recording medium and a multiple-coat high-density magnetic recording medium produced from the aromatic polyamide film laminate that have excellent electromagnetic characteristics and are suitable for high-density magnetic recording.

Means for Solving Problem

According to the studies of the present inventors, it has been found that the objects of the present invention can be attained by a film laminate that comprises at least two biaxially oriented films formed of an aromatic polyamide, wherein:

(1) the outermost layer of the laminate, film layer A, contains inorganic particles produced from hydroxides or carbonates of at least one metal selected from the groups Ia and IIa of the periodic table, the inorganic particles having an average particle diameter of 80 to 1,500 nm and the surface roughness ($Ra^A$) of the film layer A being 1 to 20 nm;

(2) the surface opposite to the layer A of the laminate, film layer B, has a surface roughness ($Ra^B$) of 0.1 to 10 nm; and (3) the surface roughness ($Ra^B$) of the film layer B is smaller than the surface roughness ($Ra^A$) of the film layer A by 1 nm or more.

The aromatic polyamide film laminate of the present invention will be described in more detail hereinafter.

DETAILED DESCRIPTION OF THE DRAWINGS

FIG. 1 is a diagram of a device for measuring the abrasion resistance of a film laminate.

DESCRIPTION OF THE SYMBOLS

1: unwind reel
2: tension controller
3, 5, 6, 8, 9 and 11: free roller
4: tensiometer (inlet)
7: fixing pin made of stainless steel SUS304 (outer diameter: 5 mm, surface roughness Ra: 20 nm)
10: tensiometer (outlet)
12: guide roller
13: wind reel Aromatic polyamides that contain aromatic nuclei and amide-bonded groups as main constituents in the main chain are used as the aromatic polyamide of the present invention. Of the aromatic polyamides, those that contain main chain-forming substituents on aromatic nuclei having para-orientation in a proportion of 50 to 99.5% of all the aromatic nuclei forming the main chain are preferable when they are used for magnetic recording media requiring strength. The proportion of the aromatic nuclei having para-orientation is more preferably 60 to 95%, particularly preferably 70 to 90%. When it is less than 50%, strength is liable to be insufficient. When it is more than 99.5%, stretching is difficult. Illustrative examples of the main chain-forming substituents include an atom or a group of atoms contained in the main chain of a polymer such as an amide group, e.g., —C(=O)—NH—, —O—, —CH$_2$—, —C(CH$_3$)$_2$—, —SO$_2$— and —S—, and other aromatic nuclei directly bonded to the aromatic nuclei. The term "para-orientation" as used herein means that an aromatic nucleus has substituents on the 1$^{st}$ and 4$^{th}$ positions when it is a phenylene group and on the 1$^{st}$ and 4$^{th}$ positions or the 2$^{nd}$ and 6$^{th}$ positions when it is a naphthylene group. Of these, the aromatic polyamide is particularly preferably a polymer compound represented by the general formula:

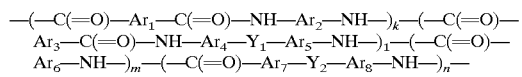

—(—C(=O)—Ar$_1$—C(=O)—NH—Ar$_2$—NH—)$_k$—(—C(=O)—Ar$_3$—C(=O)—NH—Ar$_4$—Y$_1$—Ar$_5$—NH—)$_l$—(—C(=O)—Ar$_6$—NH—)$_m$—(—C(=O)—Ar$_7$—Y$_2$—Ar$_8$—NH—)$_n$— wherein k, l, m and n are each 0 or an positive integer; Ar$_1$, Ar$_2$, Ar$_3$, Ar$_4$, Ar$_5$, Ar$_6$, Ar$_7$ and Ar$_8$ are each selected from an aromatic nucleus represented by the general formula: —C$_6$H$_p$R$_{4-p}$—, —C$_6$H$_p$R$_{4-p}$—C$_6$H$_p$R$_{4-p}$— or —C$_{10}$H$_q$R$_{6-q}$— (wherein p is an integer of 0 to 4, q is an integer of 0 to 6, and R is an atom or a group of atoms selected from a halogen group, nitro group, cyano group, alkyl group having 1 to 4 carbon atoms, alkoxy group having 1 to 3 carbon atoms and trialkylsilyl group) and may be the same or different; Y$_1$ and Y$_2$ are an atom or a group of atoms selected from O, CH$_2$, C(CH$_3$)$_2$, SO$_2$, S and CO and may be the same or different. Of these, the polymer compound is more preferably one that comprises terephthalic acid as an acid component and p-phenylenediamine and 3,4'-diaminodiphenyl ether as diamine components.

The aromatic polyamide in the present invention may contain an aliphatic or alicyclic polyamide-forming compound in such an amount that the physical properties of the film are not impaired. Further, it may also contain a compound having three or more amide-forming functional groups as a copolymer component. It may also contain a lubricant, antioxidant, other additives and the like and other polymers.

The film laminate of the present invention comprises at least two biaxially oriented films formed of the above aromatic polyamide, one of which is a film layer A, which is the outermost layer on one side of the laminate, while the other is a film layer B, which is the outermost layer on the other side thereof. Therefore, when the film laminate of the present invention comprises two films, the films are called a film layer A and a film layer B. When it comprises three films, the films are called a film layer A, an intermediate film layer and a film layer B.

That is, the layer A forms one of the outermost layers of the laminate of the present invention and the layer B forms the other outermost layer thereof. The laminate of the present invention has distinct surface roughness and other surface properties for the outermost layer (surface layer) of the film layer A and the outermost layer (surface layer) of the film layer B.

A description will be first given of the film layer A of the laminate of the present invention. The film layer A has greater surface roughness than the film layer B, which contributes to the slipperiness of the film laminate. The film layer A contains inorganic particles (which will sometimes be called "inorganic particles A" hereinafter) produced from hydroxides or carbonates of at least one metal selected from the groups Ia and IIa of the periodic table.

Illustrative examples of the inorganic particles A contained in the film layer A include lithium hydroxide, lithium carbonate, calcium hydroxide, calcium carbonate, magnesium hydroxide, magnesium carbonate and the like. Of these, lithium hydroxide, calcium hydroxide, calcium carbonate and magnesium hydroxide are preferable and calcium hydroxide and calcium carbonate are particularly preferable.

The inorganic particles A are contained in the polyamide as the residue of a neutralizing agent in the step of polymerizing an aromatic polyamide and are fully dispersed in the polymer in the polymerization step. Therefore, it is not necessary to concern that they form into agglomerates which generate abrasion dust by friction between a guide roll and the surface of the film in the step of film formation.

The average particle diameter ($d_A$) of the inorganic particles A contained in the film layer A is 80 to 1,500 nm, preferably 90 to 1,200 nm, particularly preferably 100 to 1,000 nm.

When the average particle diameter ($d_A$) of the inorganic particles A in the film layer A is smaller than 80 nm, the effect of forming protrusions on the surface by the particles is so small that sufficient handling properties such as slipperiness and winding property cannot be obtained disadvantageously. When the average particle diameter ($d_A$) is larger than 1,500 nm, voids formed by stretching the film become large in size and abrasion resistance lowers disadvantageously.

The inorganic particles A have a smaller average particle diameter than those added as a neutralizing agent. When added as a neutralizing agent, they have an average particle diameter of 300 to 20,000 nm, preferably 400 to 15,000 nm. When the average particle diameter is smaller than 300 nm, the effect of forming protrusions on the surface by the particles is so small that sufficient handling properties such as slipperiness and winding property cannot be obtained disadvantageously.

When the average particle diameter is larger than 20,000 nm, the diameters of residual particles after the neutralization reaction are so large that voids formed by stretching the film are too large in size and abrasion resistance lowers disadvantageously.

The voids are expressed by the void ratio which will be explained later. The void ratio is preferably 2.0 or less, more preferably 1.5 or less.

In the present invention, if the inorganic particles A contained in the film have an average particle diameter which falls within the above range, they may comprise two or more types of particles having different average particle diameters.

In the present invention, a means for adjusting the average particle diameter of the inorganic particles contained in the film layer A to the above range is not particularly limited. Preferable examples of the means include one in which the pH of the reaction system and the amount and particle diameters of the neutralizing agent added are adjusted in the adding step so that the above average particle diameter is provided.

A means for adjusting the particle diameters of inorganic particles to be added as a neutralizing agent is also not particularly limited. Preferable examples of the means include one comprising dispersing the particles in a solvent, grinding the particles to fine powder by a device such as a sand grinder and filtering the dispersion to remove coarse particles.

The surface roughness ($Ra^A$) of the film layer A of the laminate of the present invention is 1 to 20 nm, preferably 2 to 10 nm, more preferably 3 to 8 nm. When the surface roughness ($Ra^A$) the film layer A is smaller than 1 nm, the laminate is difficult to wind in the production step or subsequent processing step thereof. On the other hand, if the surface roughness ($Ra^A$) is larger than 20 nm, it may possibly roughen the surface of the film layer B disadvantageously.

The surface roughness ($Ra^B$) of the film layer B that is the opposite surface of the film layer A of the laminate of the present invention is 0.1 to 10 nm, preferably 0.1 to 5 nm, particularly preferably 0.2 to 4 nm, the most preferably 0.3 to 3 nm.

When the surface roughness $Ra^B$ of the layer B is smaller than 0.1 nm, the laminate is apt to stick to a pass roll in the production step. When it is larger than 10 nm, on the other hand, electromagnetic conversion characteristics deteriorate. Further, when the surface roughness $Ra^B$ of the layer B is smaller than the surface roughness $Ra^A$ of the layer A by 1 nm, the laminate has better handling properties, and exhibits excellent electromagnetic conversion characteristics when used for high-density magnetic recording media. It is more advantageous that the surface roughness ($Ra^B$) of the film layer B be smaller than the surface roughness ($Ra^A$) of the film layer A by 2 to 5 $\mu$m.

The film layer B may contain substantially no particles, or it may contain particles in such an amount that the surface roughness ($Ra^B$) of the layer B remains within the above range. When the film layer B contains particles, the average particle diameter ($d_B$) thereof is 5 to 600 $\mu$m, preferably 60 to 600 $\mu$m, particularly preferably 5 to 200 $\mu$m.

Illustrative examples of the solid particles (called "particles B") to be contained in the film layer B include fine particles produced from a heat-resistant organic polymer such as crosslinked silicone resin, crosslinked polystyrene, crosslinked styrene-divinylbenzene copolymer, polymethyl methacrylate, crosslinked methyl methacrylate copolymer, polytetrafluoroethylene, polyvinylidene fluoride, polyacrylonitrile and benzoguanamine resin; fine particles produced from hydroxides or carbonates of at least one metal selected from the groups Ia and IIa of the periodic table, such as lithium hydroxide, lithium carbonate, calcium hydroxide, calcium carbonate, magnesium hydroxide and magnesium carbonate; and fine particles produced from an inorganic compound such as silica, alumina, titanium dioxide, kaolin, talc, graphite, feldspar, molybdenum disulfide, carbon black and barium sulfate.

Of the above particles B, fine particles produced from hydroxides or carbonates of at least one metal selected from the groups Ia and IIa of the periodic table, such as lithium hydroxide, lithium carbonate, calcium hydroxide, calcium carbonate, magnesium hydroxide and magnesium carbonate are preferable; lithium hydroxide, calcium hydroxide, calcium carbonate and magnesium hydroxide are more preferable; and calcium hydroxide and calcium carbonate are particularly preferable.

The particles B produced from hydroxides or carbonates of metals of the groups Ia and IIa which have an average particle diameter of 50 to 5,000 nm are more preferably added in the step of polymerizing an aromatic polyamide and contained as the residue of a neutralizing agent because the obtained laminate of the present invention has excellent dispersibility and not many protrusions fall off when it makes contact with a pass roll.

When the particle diameter of the solid particles B contained in the film layer B is 600 nm or more, electromagnetic conversion characteristics deteriorate. On the other hand, when it is less than 5 nm, the laminate has a high friction coefficient against a magnetic head when actually used as a tape and its electromagnetic conversion characteristics deteriorate when it is used repeatedly.

The laminate of the present invention can be advantageously used as a base film for high-density recording media by having the distinct surface roughnesses of the film layer A and the film layer B on both sides thereof within the above ranges.

It is more desirable that each of the film layer A and the film layer B of the laminate of the present invention have a surface protrusion density that falls within the following proper range.

That is, the inorganic particles A are contained in the film layer A in such an amount that the density of protrusions on the surface of the film layer A is $1\times10$ to $1\times10^5$/mm$^2$, preferably $5\times10$ to $1\times10^5$/mm$^2$, particularly preferably $1\times10^2$ to $5\times10^4$/mm$^2$. When the density of protrusions is less than $1\times10^1$/mm$^2$, the friction coefficient becomes so large that a good running property cannot be obtained, that the winding property deteriorates and that blocking is liable to occur between the films. On the other hand, when the density of protrusions is more than $1\times10^5$/mm$^2$, the protrusions are transferred to the magnetic surface and form hollows when the laminate is formed into a tape, whereby the electromagnetic conversion characteristics deteriorate.

Meanwhile, it is desirable that the density of protrusions on the surface of the film layer B be $1\times10^2$ to $1\times10^8$/mm$^2$, preferably $1\times10^3$ to $1\times10^8$/mm$^2$, particularly preferably $5\times10^3$ to $5\times10^7$/mm$^2$.

A description will be given of a method of polymerizing an aromatic polyamide forming the film layers A and B of the present invention and a method of forming the film layers.

The aromatic polyamide of the present invention can be produced by interfacial polymerization or solution polymerization using acid components and amine components known per se as monomers used as raw materials. The solution polymerization is preferable.

When the solution polymerization is used, a polymerization solvent used may contain at least one solvent selected from polar solvents such as dimethylformamide, dimethylacetoamide, N-methylpyrrolidone, N-methylcaprolactam, dimethyl sulfoxide, hexamethylphosphoric triamide, tetramethylurea and 1,3-dimethyl-2-imidazolizinone, as a main component(s).

Of these polar solvents, N-methylpyrrolidone is preferably used.

Further, inorganic salts such as calcium chloride, lithium chloride and the like may be added to the polymerization solvent before, during or after polymerization for the purpose of improving the solubility of a polymer.

In the production of the aromatic polyamide of the present invention, acid components (typified by acid chloride) and amine components are reacted substantially in equimolar amounts. However, it is possible to use one of them in an excessive amount over the other for the purpose of, for example, controlling the degree of polymerization. Further, a small amount of monofunctional acid components or amine components may be used as a terminal blocking agent.

It is also possible to add aliphatic or aromatic amines or quaternary ammonium salts to the polymerization system for the purpose of trapping hydrogen chloride produced by reaction.

Furthermore, the aromatic polyamide of the present invention may contain ultraviolet absorber, dye, release agent and other additives in such an amount that does not impair the effect of the present invention.

After the polymerization reaction completes, a neutralization reaction is carried out by adding the above inorganic particles produced from hydroxides or carbonates of metals of the groups Ia and IIa which have an average particle diameter of 300 to 20,000 nm for the film layer A and those which have an average particle diameter of 50 to 5,000 nm for the film layer B. If this neutralization reaction does not fully proceed, halogen ions (chloride ions in particular) from the film surface remains in such an amount that causes an adverse effect. Therefore, when the laminate is used for a thin metal film magnetic recording medium, the thin magnetic metal film thereof is damaged particularly under a high-temperature and high-humidity environment, so that its performance cannot be stably retained disadvantageously.

Generally used methods of producing the aromatic polyamide are described in detail in JP-B 52-39719, JP-B 53-32828 and the like.

To obtain the aromatic polyamide laminated film of the present invention having excellent mechanical properties, a polymer before the formation of a film has a logarithmic viscosity of preferably 0.5 dl/g or more, more preferably 1.0 dl/g or more.

The logarithmic viscosity of the polymer before the formation of a film is obtained by charging a polymer stock solution containing the aromatic polyamide after polymerization into a solvent such as alcohol or water, isolating and purifying the re-precipitated polymer and measuring the polymer in concentrated sulfuric acid at 30° C.

The polymer stock solution (dope) containing the aromatic polyamide that has been polymerized as describe above may be used for the formation of a film by charging the solution into a solvent such as alcohol or water, isolating the re-precipitated polymer and dissolving the polymer in a solvent again. It may be used in the formation of a film directly or after its concentration is properly adjusted after polymerization.

At this point, the concentration of the polymer stock solution may be adjusted by concentrating it or diluting it with a solvent. The solvent may be the same as those listed for the polymerization solvent.

The polymer stock solution whose concentration has been adjusted as described above is formed into a film by a solution film formation process. The solution film formation process is exemplified by a dry-wet process, a dry process or a wet process. The dry-wet process and the wet process are preferable because they can remove the salts produced by the above neutralization reaction.

When a film is formed by the dry process, a film which has acquired self-holding properties by being dried on a carrier such as drum, endless belt and the like is peeled from the carrier, further dried to remove the residual solvent, stretched and subjected to heat treatment. Each these treatments is carried out preferably at 100 to 500° C. for one second to 30 minutes, particularly preferably at 100 to 400° C. for three seconds to 20 minutes.

A film having good surface properties can also be obtained by the dry process. However, since this film-forming process does not have a step of removing the salts produced by the neutralization in the polymerization step, an undesirable amount of halogen ions remains on the surface of a film. Therefore, when the obtained film is used for a metal thin film magnetic recording medium, its thin magnetic metal film is damaged particularly under a high-temperature and high-humidity environment, so that its performance cannot be stably retained disadvantageously.

When the film is formed by the wet process, on the other hand, it is preferable to extrude the stock solution into a bath for film formation directly from a cap or to extrude it onto a carrier such as drum and then introduce the carrier into a wet bath. The bath generally comprises a water-based medium and may contain organic solvents or inorganic salts in addition to water. However, to improve extraction efficiency so that the salts and organic solvents are extracted and removed completely, it is preferable that use of the wet bath be divided into two or more steps and that the wet bath in the last step comprise only water. The salts and organic solvents contained in the film can be extracted and removed by causing the film to pass through the wet bath.

Although depending on the thickness of the film, the amount of time needed for the film to pass through the whole wet bath is preferably 10 seconds to 30 minutes so that the amount of halogen ions on the surface of the film can be adjusted to 50 ng/cm$^2$ or less and the content of organic polar solvents contained in the film to 50 ppm or less by extracting the halogen ions and the organic polar solvents from the surface of the film.

The film that has passed through the wet bath is stretched in a longitudinal direction, dried, stretched in a transverse direction and subjected to heat treatment. Each of these treatments is carried out preferably at 100 to 500° C. for one second to 30 minutes, particularly preferably at 100 to 400° C. for three seconds to 20 minutes.

When the film is formed by the dry-wet process, the stock solution is extracted onto a carrier such as drum, endless belt and the like from a cap to form a thin film, which is then dried by scattering a solvent from the thin film layer until the thin film acquires self-holding properties. It is preferable to dry the thin film at room temperature to 300° C. within 60 minutes. The dried thin film is peeled off from the carrier and then introduced into a wet process, salts and solvents are removed in the same manner as in the aforementioned wet process, and the resulting thin film is further stretched, dried and subjected to heat treatment to form a film.

The film laminate of the present invention can be formed by a method known per se of laminating at least two types of film-forming stock solutions, one of which is for the film layer A while the other is for the film layer B, in a confluent pipe or a cap, as is described in JP-A 56-162617. Another layer may be formed between the two layers in a cap having three (or more) layers as required.

It is preferable to supply the stock solution with the film layer A facing the carrier because the surface of the opposite side (film layer B) can be kept flat. It is also possible to form the film laminate by forming a film having self-holding properties with one of the above film-forming stock solutions and supplying the other film-forming stock solution on the film to remove solvents. Particularly, when the lamination is carried out in a confluent pipe or a cap, it is preferable to adjust the viscosities of the stock solutions to 100 to 10,000 poise. When it is less than 100 poise, two or more stock solutions are easily mixed together before extracted from a cap and, in the case of a thin film, even a small amount of the mixture roughens the opposite side of the inorganic particles-containing layer. On the other hand, when it is larger than 10,000 poise, two or more stock solutions are not so easily mixed together; however, melt fracture occurs, whereby the surface of the film is easily roughened disadvantageously.

The viscosities of the two or more stock solutions are preferably the same but may be slightly different from one another. The highest viscosity of the solutions can be as high as 200% of the lowest viscosity of the solutions.

When the dry process or the dry-wet process is employed, two or more stock solutions may be mixed together in the drying step. The viscosity of the stock solution that has been supplied onto the carrier decreases once when the solution is heated, and it increases again along with the evaporation of the solvent. When the viscosity decreases to a value less than 10 poise, the two or more stock solutions are easily mixed together. It is therefore necessary to properly adjust the drying condition so as not to decrease the viscosity to a value less than 10 poise. For example, it is preferable to raise the drying temperature in at least two steps.

The layers other than the film layer A are preferably formed of an aromatic polyamide having the same polymer composition as that of the film layer A.

The obtained aromatic polyamide film is formed into a biaxially oriented film that has been stretched preferably at an area stretch ratio of 5.0 or higher, more preferably 6.0 to 10.0.

The biaxially oriented film of the present invention may be formed by laminating the layers first and then stretching the resulting laminate or by stretching each of the layers first and then laminating them. The former is advantageous in view of production.

When the area stretch ratio is less than 5, the obtained film laminate does not have high strength. Further, its handling properties such as slipperiness and winding property are not satisfactory because the effect of forming protrusions on the surface by the particles that will be described later is small.

The thickness of the film laminate obtained in the above step is not particularly limited but is preferably 0.1 to 20 $\mu$m, more preferably 0.5 to 10 $\mu$m. The ratio of the thicknesses of the layer A and the layer B is not particularly limited but is preferably 1:9 to 5:5, more preferably 2:8 to 4:6.

When the thickness of the film laminate is within the above range, the film laminate of the present invention has excellent handling properties such as strength, slipperiness and winding property, exhibits high abrasion resistance and can be suitably used for magnetic recording media.

It is also possible to form a thin coating layer whose thickness is small enough not to impair the effect of the present invention on the surface of the aromatic polyamide film laminate of the present invention for the purpose of improving its adhesive properties and slipperiness and preventing static electrification.

While the aromatic polyamide film laminate of the present invention can be produced as described above, the laminate may be further coated with a water-based coating solution of a water-dispersible or water-soluble polymer, stretched as required and dried, to improve its adhesion to a magnetic layer, as a pretreatment before the magnetic layer is formed. The water-based coating solution may contain antistatic agents, surfactants, superfine particles and the like in addition to the above polymer according to purpose.

The aromatic polyamide laminate of the present invention obtained as described above has such physical properties, chemical properties and surface properties as will be described below and has characteristic properties that are extremely suitable for use as a base film for high-density magnetic recording media.

The aromatic polyamide laminate of the present invention has high Young's modulus. The total of Young's moduli in longitudinal and transverse directions is 2,000 to 4,500 kg/mm$^2$, preferably 2,200 to 4,000 kg/mm$^2$. The Young's modulus in the longitudinal direction and that in the transverse direction are each 500 to 3,500 kg/mm$^2$, preferably 600 to 3,000 kg/mm$^2$.

When the total of Young's moduli in longitudinal and transverse directions is less than 2,000 kg/mm$^2$, the laminate makes improper contact with a recording head, so that electromagnetic conversion characteristics deteriorate. Further, the base film is as thin as several micrometers, so that sufficient strength cannot be obtained disadvantageously.

The aromatic polyamide film laminate has a flexural rigidity in a longitudinal direction of 3.0 to 9.5 mg·mm, preferably 5.0 to 9.5 mg·mm. When the flexural rigidity in the longitudinal direction is smaller than 3.0 mg·mm or larger than 9.5 mg·mm, the laminate makes improper contact with a recording head, so that electromagnetic conversion characteristics deteriorate.

Further, the aromatic polyamide film laminate of the present invention has a tensile break strength in a longitudinal direction of 38 to 100 kg/mm$^2$, preferably 42 to 90 kg/mm$^2$ or more. When the tensile break strength is smaller than 38 kg/mm$^2$, the laminate may cause a problem particularly when used for a magnetic tape which is caused to run and stop repeatedly.

The aromatic polyamide film laminate of the present invention has a heat shrinkage factor in an arbitrary direction at 150° C. of less than 1%. When the heat shrinkage factor is more than 1%, the reliability of the performance of the recording medium may be lost depending on the circumstance under which it is used.

The aromatic polyamide film laminate of the present invention has an air vent index of 1 mmHg/hr or more. When the air vent index is less than 1 mmHg/hr and the film is rolled in its production process, protrusions which are defects are liable to be produced on the surface of the rolled film, thereby lowering the yield of winding of the film. The air vent index is preferably 3 mmHg/hr or more, more preferably 4 mmHg/hr or more.

The aromatic polyamide film laminate of the present invention has a friction coefficient of 0.6 or less, preferably 0.4 or less.

In the aromatic polyamide laminate of the present invention, the amounts of halogen ions (especially chlorine ions) and organic polar solvents contained in the layer B thereof are extremely small. Therefore, the performance of the magnetic recording medium layer formed on the surface of the film layer B can be stably retained for a long time. That is, the amount of halogen ions contained in the film layer B is 50 ng/cm$^2$ or less, preferably 40 ng/cm$^2$ or less. If the amount of the halogen ions is more than 50 ng/cm$^2$, the stability of the performance of the magnetic recording medium layer may possibly be impaired. As for the amount of organic polar solvents contained in the film layer B, it is advantageous that the amount be 50 ppm or less, preferably 40 ppm or less. If the amount of the organic polar solvents is too large, the long-term stability of the performance of the magnetic recording medium layer may be affected.

Therefore, according to the present invention, a magnetic recording medium obtained by forming a magnetic recording medium layer on the surface of the film layer B of the above aromatic polyamide film laminate is provided. The magnetic recording medium may be either a metal-thin-film high-density magnetic recording medium or a coated high-density recording medium.

In the case of the metal-thin-film high-density magnetic recording medium, a ferromagnetic metal thin film layer made of iron, cobalt, chromium or an alloy thereof or oxide thereof is formed on the surface of the film layer B of the aromatic polyamide film laminate by vacuum vapor deposition, sputtering, ion plating or the like, and a protective layer of diamond-like carbon (DLC) or the like and a fluorine-containing carboxylic acid-based lubricant layer are formed in turn on the surface of the ferromagnetic metal thin film layer according to purpose and application and as required. A known back coat layer is formed on the surface opposite to the metal thin film layer. Thereby, there can be obtained a metal-thin-film high-density magnetic recording medium which has excellent electromagnetic conversion characteristics such as output at a short-wavelength range, S/N and C/N, few drop-outs and a small error rate.

This metal-thin-film high-density magnetic recording medium is extremely useful as a tape medium for Hi8 for analog signal recording and for digital video cassette recorders (DVC), data 8 mm and DDSIV for digital signal recording.

The coated high-density magnetic recording medium is produced by applying a magnetic coating to the surface of the film layer B of the aromatic polyamide film laminate of the present invention.

The magnetic coating includes a metal-based magnetic coating and a metal oxide-based magnetic coating.

The metal-based magnetic coating is obtained by mixing magnetic metals or magnetic materials containing magnetic metals as main components into a binder. For example, the metal-based magnetic coating may be produced by uniformly dispersing iron or needle-like fine magnetic iron powder containing iron as a main component into polyvinyl chloride or vinyl chloride-vinyl acetate copolymer.

The metal oxide-based magnetic coating is obtained by mixing magnetic metal oxides or magnetic materials containing magnetic metal oxides as main components into a binder. For example, the metal-based magnetic coating may be produced by uniformly dispersing needle-like fine magnetic powder composed of iron oxide or chromium oxide or leaf-like fine magnetic powder such as barium ferrite into a binder such as polyvinyl chloride or vinyl chloride-vinyl acetate copolymer.

The magnetic coating is preferably applied to the present invention to form a magnetic layer having a total thickness of 1 $\mu$m or less, preferably 0.1 to 1 $\mu$m.

Further, by forming a back coat layer on the surface opposite to the magnetic layer by a known method, there can be obtained a coated magnetic recording medium for high-density recording which has excellent electromagnetic conversion characteristics such as output at a short-wavelength range, SIN and C/N, few drop-outs and a small error rate.

Moreover, a non-magnetic layer containing a fine particle such as titanium oxide particles may be optionally formed on the layer on which the magnetic layer is to be formed as a layer underlying the magnetic layer by dispersing in the same organic binder as that of the magnetic layer and applying.

This coated high-density magnetic recording medium is extremely useful for use as a tape medium for 8-mm video, Hi8, $\beta$-cam SP and W-VHS for analog signal recording and for digital video cassette recorders (DVC), data 8 mm, DDSIV, digital $\beta$-cam, D2, D3, SX, and QIC for data streamer for digital signal recording.

EXAMPLES

The present invention will be described in detail with reference to examples hereinafter but shall not be limited thereto. Various physical properties and characteristic properties in the present invention are measured and defined in the following manner.

(1) pH of Polymer Solution

Five grams of a polymer solution is sampled and added to 300 ml of water. After the resulting aqueous solution is stirred for 2 minutes, the pH of the aqueous solution is measured.

(2) Average Particle Diameter of Particles (a) Average Particle Diameter of Particles Before Added to Polymer Solution This is measured using the centrifugal particle size analyzer CP-50 of Shimadzu Corporation. A cumulative curve of the particles of each diameter and the amount thereof is calculated based on the obtained centrifugal sedimentation curve, and a particle diameter equivalent to 50 weight percent is read from the cumulative curve and taken as the average particle diameter (refer to "Book of Particle Size Measurement Technology" issued by Nikkan Kogyo Press, pp. 242–247, 1975).

(b) Average Particle Diameter of Particles in Film

A film-forming stock solution after the addition of neutralizing agent particles is measured for the average particle diameter of particles in the same manner as in (a).

In addition, for the purpose of verification, a small sample piece of the film is enwrapped in an epoxy resin (Epomount, a product of Refinetech Co., Ltd.), which is then sliced to a thickness of 60 nm with the sample piece wrapped therein, using Microtome 2050 of Reichert-Jung Co., Ltd. The sliced film is observed under a transmission electron microscope (model H-800 of Hitachi, Ltd.) to select 25 cross sections of particles existing in a layer to be evaluated, and the particle diameters of the selected particles are measured and averaged. The result of the measurement was the same as that obtained in (a).

(3) Logarithmic Viscosity

A polymer stock solution containing an aromatic polyamide after polymerization is added to a solvent such as an alcohol or water, and the logarithmic viscosity of a polymer which is re-precipitated and separated is measured at 30° C. in concentrated sulfuric acid.

(4) Area Stretch Ratio

This is obtained by multiplying a stretch ratio in a longitudinal direction by a stretch ratio in a transverse direction of the film.

(5) Surface Roughness of Film (Center Line Average Roughness: Ra)

The center line average roughness (Ra) is defined in accordance with JIS B0601 and measured using the tracer-type surface roughness meter (SURFCORDER SE-30C) of Kosaka Laboratory Co., Ltd. in the present invention. The measurement conditions are as follows.

(a) radius of tracer tip: 2 μm
(b) measurement pressure: 30 mg
(c) cut-off: 0.08 mm
(d) measurement length: 8.0 mm
(e) data filing: The measurement of the surface roughness of the same sample is repeated six times and the average of the measurement values excluding the largest value is taken as the center line average roughness (Ra).

(6) Density of Protrusions

Twenty five pictures of the surface of the film are taken randomly at a magnification of 5,000 times and an angle of 0° using a scanning electron microscope (T-300 of JEOL Ltd.) and the number of protrusions on the surface of the film in each photograph is counted. The number of protrusions per $mm^2$ is calculated by averaging the numbers of protrusions of the photographs.

(7) Void Ratio

The film is etched to a depth of 500 nm from the surface using a plasma reactor (PR31 of Yamato Kagaku Co., Ltd.). Twenty five photographs of the surface of the etched sample are taken at random at a magnification of 5,000 times and an angle of 0° using a scanning electron microscope (T-300 of JEOL Ltd.) to measure the long diameter of a particle appeared on the surface and the long diameter of a void around the particle. The void ratio is obtained from the following equation.

void ratio=(long diameter of void)/(long diameter of particle)

(8) Friction Coefficient

A static friction coefficient ($\mu_s$) under a load of 1 kg is measured in accordance with ASTM D1894-63 using a slippery measuring instrument (manufactured by Toyo Testor Co., Ltd.) and a glass plate as a sled plate. The obtained value is evaluated based on the following criteria.

| $\mu_s$ | criteria |
|---|---|
| less than 0.6 | ⊚ |
| 0.6 to 0.8 | ○ |
| more than 0.8 | x |

(9) Running Friction Coefficient

This is measured in the following manner using the device shown in FIG. 1.

A film cut to a width of 8 mm is brought into contact with the fixed pin 7 at an angle of 90° (=π/2 radian) and moved (friction) at a speed of 3 m/min at a temperature of 20° C. and a humidity of 60 % RH. A tension $T_1$ at the inlet is adjusted to 50 g with the tension controller 2 and the tension $T_2$ at the outlet after the film is allowed to run 200 m is detected with the tensiometer 10 at the outlet. The running friction coefficient is calculated from the following equation and evaluated on the basis of the following criteria.

running friction coefficient=$(2/\pi)\cdot\ln\cdot(T_2/T_1)$

| running friction coefficient | evaluation criteria |
|---|---|
| less than 0.4 | ⊚ |
| 0.4 or more and less than 0.6 | ○ |
| 0.6 or more | x |

(10) Abrasion Resistance (Against Pin)

This is measured using the device shown in FIG. 1.

At a temperature of 20° C. and a relative humidity of 60%, the film cut to a width of ½ inch is brought into contact with the fixing pin 7 at angle of θ=(90/180)π radian (90°) and caused to run 5 m at a speed of 2 m/min (inlet tension is fixed at 40 g), and abrasion resistance is evaluated on the basis of the following criteria.

No abrasion dust is adhered to the pin ⊚
slight amount of abrasion dust is adhered to the pin ○
large amount of abrasion dust is adhered to the pin x

(11) Abrasion Resistance (Calendering)

This is evaluated using a three-roll mini-super calender (nylon roll×steel roll). The film is caused to run 7,000 m at a speed of 100 m/min at a processing temperature of 90° C. and a linear pressure of 300 kg/cm. This is evaluated from stains adhered to the nylon roll of the calender based on the following criteria.

nylon roll is not stained ⊚
nylon roll is slightly stained ○
nylon roll is severely stained x

(12) Winding Property

After winding conditions at the time of slitting are optimized, the film is slit to obtain 10 rolls, each having a width of 560 mm and a length of 9,000 m and the rolls are then left for one week. Thereafter, the occurrence of wrinkles on the film surface is observed for each of the rolls and the number of rolls which can be commercialized is determined. The winding property of the rolls is evaluated based on the following criteria.

| number of commercializable rolls | criteria |
|---|---|
| 9 or more | ⊚ |
| 7 to 8 | ○ |
| 4 to 6 | x |
| 3 or less | xx |

(13) Air Vent Index

Twenty films each of which has a size of 8 cm×8 cm are placed one upon another and a triangle-shaped hole each side length of which is 2 mm is created in each of the films except for the top film. The measurement is started using a Digital Bekk flatness tester of Toyo Seiki Co., Ltd. after pressure is set at 560 mmHg, and a change in pressure after one hour is read. This measurement is repeated five times and the average value of the measurement values is taken as air vent index (mmHg/hr).

(14) Mechanical Properties
(a) Young's Moduli

A sample is prepared by cutting the film to a width of 10 mm and a length of 150 mm, and this sample is pulled by a tensile tester (TENSILON of Toyo Baldwin Co., Ltd.) at a chuck interval of 100 mm and a pulling rate of 10 mm/min in a room adjusted to a temperature of 20° C. and a relative humidity of 50%. The Young's modulus is calculated from the tangent of a rising portion of the obtained stress-strain curve.

(b) Flexural Rigidity

This is calculated based on the following equation from the inclination of the tangent of a rising portion of the obtained stress-strain curve by pulling the film at a chuck interval of 100 mm and a pulling rate of 5 mm/min using the same apparatus and measurement conditions as in the above measurement of Young's modulus.

flexural rigidity (mg·mm)=[($10^6$ (mg/kg))×(inclination of tangent (kg/mm$^2$))×(film thickness (mm))$^3$]/12

(c) Tensile Break Strength

A stress at the time when the film is broken by pulling it at a chuck interval of 100 mm and a pulling rate of 100 mm/min using the same apparatus and measurement conditions as in the measurement of Young's modulus is taken as break strength. The cross section area of the sample film is taken as an initial value before it is pulled.

(15) Thermal Shrinkage

Ten 350 mm×350 mm samples of the film are prepared, to ensure that the distance ($L_0$ (mm)) between the two points should be 300 mm. The marked sample films are hung in a hot-air circulating constant temperature chamber maintained at 150° C. under no tension, these films are taken out from the chamber after held in the chamber for 30 minutes, and the distance (L (mm)) between the two points of the films is measured. Thermal shrinkages (unit: %) obtained from the following equation are averaged.

thermal shrinkage=100×[($L_0$−L)/$L_0$]

(16) Film Thickness

The total thickness of the film is obtained by averaging thicknesses at 10 points which are measured randomly by a micrometer. A ultra-thin piece of the film is observed under a transmission electron microscope to obtain the thickness of the layer from the cross section of the layer as in the measurement of the particle diameters of the particles in the film.

(17) Electromagnetic Conversion Characteristics (A)

A magnetic coating prepared as follows is applied to the flat surface of the film to a thickness of 1.2 μm, aligned in a DC magnetic field of 2,500 Gauss, dried by heating at 120° C. and subjected to super-calendering (linear pressure: 300 kg/cm, temperature: 90° C.), and the resulting film is wound up into a roll. This roll is left in an oven at 55° C. for three days.

<Preparation of Magnetic Coating>

After the composition shown below is charged into a ball mill, kneaded for 16 hours and dispersed, 5 parts by weight of an isocyanate compound (Desmodule L of Bayer AG) is added to the ball mill and dispersed by high-speed shearing for one hour to prepare a magnetic coating.

| *composition of coating: | |
|---|---|
| needle-like Fe particles | 100 parts by weight |
| vinyl chloride-vinyl acetate copolymer (Slec 7A of Sekisui Chemical Co., Ltd.) | 15 parts by weight |
| thermoplastic polyurethane resin | 5 parts by weight |

| *composition of coating: | |
|---|---|
| chromium oxide | 5 parts by weight |
| carbon black | 5 parts by weight |
| lecithin | 2 parts by weight |
| fatty acid ester | 1 part by weight |
| toluene | 30 parts by weight |
| methyl ethyl ketone | 50 parts by weight |
| cyclohexanone | 70 parts by weight |

Further, a coating solution having the following composition is applied to the film surface opposite to the magnetic recording layer of the film to a thickness of 0.5 μm as a back coat layer, dried and cut to give a magnetic tape.

| *composition of back coat layer: | |
|---|---|
| carbon black | 100 parts by weight |
| thermoplastic polyurethane resin | 60 parts by weight |
| isocyanate compound (Colonate L of Nippon Polyurethane Kogyo Co., Ltd.) | 18 parts by weight |
| silicone oil | 0.5 part by weight |
| methyl ethyl ketone | 250 parts by weight |
| toluene | 50 parts by weight |

The characteristic properties of the tape is measured using the following commercially available devices.

* used devices:

8-mm video tape recorder: EDV-6000 of Sony Corp.

C/N measurement: noise meter of Shibasoku Co., Ltd.

(a) C/N Measurement

A signal having a recording wavelength of 0.5 μm (frequency of about 7.4 MHz) is recorded, the ratio of values of its reproduction signal at 6.4 MHz and 7.4 MHz is taken as C/N of the tape, and C/N is evaluated based on the following criteria with the value obtained in the following Comparative Example 9 as a reference.

not smaller than (reference+3 dB) ⊚ smaller than (reference+3 dB) to (reference+1 dB) ○ smaller than (reference+1 dB) ×

(b) Drop-outs

The number of drop-outs per minute at 20 μs/20 dB was measured using a drop-out counter.

0 to 19 drop-outs per minute ○

20 or more drop-outs per minute ×

(c) Running Durability

The C/N of the tape was measured after the recording and reproduction of the tape at a tape running speed of 85 cm/min, a temperature of 25° C. and a humidity of 55% RH were repeated 1,000 times. The running durability of the tape was evaluated on the following criteria on the basis of the amount of deviation from the initial value.

| deviation from initial value | evaluation |
|---|---|
| −1.0 dB or higher | ○ |
| less than −1.0 dB | x |

(18) Electromagnetic Conversion Characteristics (B)

A ferromagnetic thin film made of 100% of cobalt is formed on the surface of the film layer B by vacuum vapor deposition to form two layers having a total thickness of 0.02 μm (each has a thickness of about 0.01 μm). Then, a diamond-like carbon (DLC) film and a fluorine-containing carboxylic acid-based lubricant layer are formed in turn on the surface of the above layers, and a back coat layer is formed on the surface opposite to the magnetic layer by a known method. Thereafter, the obtained film is slit to a width of 8 mm and loaded in a commercial 8-mm video cassette. The characteristic properties of the tape are measured using the following commercially available devices.

* used devices:
  8-mm video tape recorder: EDV-6000 of Sony Corp.
  C/N measurement: noise meter of Shibasoku Co., Ltd.

(a) C/N Measurement

A signal having a recording wavelength of 0.5 μm (frequency of about 7.4 MHz) is recorded, the ratio of values of its reproduction signal at 6.4 MHz and 7.4 MHz is taken as C/N of the tape, the C/N of a deposited tape for a commercially available 8 mm video is regarded as 0 dB, and C/N is evaluated with a relative value based on the following criteria.

| relative value | C/N |
| --- | --- |
| not smaller than (reference + 3 dB) | ⊚ |
| smaller than (reference + 3 dB) to (reference + 1 dB) | ○ |
| smaller than (reference + 1 dB) | x |

(b) Running Durability

The C/N of the tape is measured after the recording and reproduction of the tape at a tape running speed of 85 cm/min, a temperature of 55° C. and a humidity of 75% RH are repeated 400 times. The running durability of the tape is evaluated on the following criteria on the basis of the amount of deviation from the initial value.

| deviation from initial value | evaluation |
| --- | --- |
| not less than +0.0 dB | ⊚ |
| −1.0 dB or higher and less than +0.0 dB | ○ |
| less than −1.0 dB | x |

(19) Heat and Humidity Stability

The tape is left to stand at a temperature of 60° C. and a humidity of 80% RH for 90 hours to observe visually if the deposited surface thereof is corroded. The heat and humidity stability of the tape is evaluated on the basis of the following criteria.

| result of visual observation | evaluation |
| --- | --- |
| not corroded | ○ |
| corroded | x |

(20) Content of Halogen Ions

This is measured in the manner consisting of the following steps.
1) Ten milliliters of ultra-pure water is charged in a petri dish-type Teflon container.
2) A sample obtained by cutting the film to a square shape each side length of which is 5 cm is floated on the water with the extraction surface thereof facing the water.
3) Ultrasound is applied to the sample for 30 minutes.
4) The obtained extract is analyzed by ion chromatography.

<Measurement Conditions for Ion Chromatography>
  model: 4000I of Dionex Co., Ltd.
  column: Ionpac AG4A-SC/AS4A-SC
  eluant: 1.80 mM of $Na_2CO_3$+1.70 mM of $NaHCO_3$
  regenerant: 0.025 N of $H_2SO_4$
  detector: electrical conductivity
  flow rate: 1.5 ml/min
  suppressor: micromembrane suppressor
  detected ions: $F^-$, $Cl^-$, $N_2^-$, $Br^-$, $NO_3^-$, $PO_4^{3-}$, $SO_4^{2-}$

(21) Content of Organic Polar Solvent

One to 100 milligrams of a sample film is accurately weighed according to the residual solvent, and the sample film is measured by a gas chromatograph (GC) using thermal extraction under the following conditions. measurement conditions GC model: 5890 series II (of HEWLETT PACKARD)
  column: DB-17 (0.25 mmφ×30 m×0.5 μm, J&W) column temperature: 160 to 220° C. for 2 minutes at 80° C./min
  injection port temperature: 300° C. with split ratio of 1/60
HS model: JHS-100 (of Nippon Bunseki Kogyo Co., Ltd.)
  temperature and time for heat treatment: 280° C.×10 min
  adsorption temperature and adsorbent: −60° C. and quartz wool temperature and time for desorption: 20 to 255° C. and 20 seconds Example 1

Twenty five mole percent of p-phenylenediamine and 25 mol % of 3,4-diaminodiphenyl ether as diamine components and 50 mol % of terephthalic acid chloride as an acid component were polymerized in NMP (N-methyl pyrrolidone).

The obtained polymer was divided into two portions. Then, for the film layer A, a NMP slurry of calcium hydroxide having an average particle diameter of 2,000 nm was prepared by dispersing calcium hydroxide having an average particle diameter of 8,000 nm (a product of Inoue Sekkai Co., Ltd.) in NMP by a homogenizer, grinding the resulting mixture by a sand grinder to have an average particle diameter of 3,000 nm and filtering the resulting particles with a 50-μm-mesh filter (HDC II, a product of Nippon Poll Co., Ltd.). This NMP slurry was added to one of the two portions of the polymer in such an amount that ensured that 50.4 mol % of calcium hydroxide should correspond with 50 mol % of the terephthalic acid chloride used above, to prepare a film-forming stock solution (A) having a pH of 4.7. This portion of the polymer had a logarithmic viscosity of 3.5.

A film-forming stock solution (B) having a pH of 3.8 was prepared for the film layer B by adding a NMP slurry of calcium hydroxide having an average particle diameter of 2,000 nm to the other portion of the polymer (which had a logarithmic viscosity of 3.5).

These stock solutions were formed into a laminate of two layers in a cap such that each of the layer A and the layer B of a target film should have a thickness of 2.0 μm. The laminate was cast on a metal belt at 100° C., dried for two minutes at 100° C., and then dried at 120° C. and 150° C. stepwise for 10 minutes in total to obtain an unstretched film having self-holding properties. The unstretched film was obtained with the film layer A exposed to air and the film layer B facing the belt. The unstretched film was peeled off from the belt continuously and introduced into water bath to remove the solvent and the salt.

The resulting unstretched film laminate was stretched to 2.7 times in a longitudinal direction at 350° C. between low-speed and high-speed rolls, supplied to a tenter, stretched to 2.7 times in a transverse direction at 380° C. to obtain a biaxially oriented film, which was then subjected to heat treatment at 400° C. for one minute to obtain an aromatic polyamide film laminate having a final thickness of 4.0 μm.

The residual particles of the neutralization agent in the film layer A of the obtained aromatic polyamide film laminate had an average particle diameter of 400 nm. On the other hand, no particles which could be considered as the residual particles of the neutralization agent were found in the film layer B. Physical properties and characteristic properties of the obtained film laminate are shown in Table 2.

Example 2

An aromatic polyamide film laminate having a final thickness of 4.0 μm was obtained under the condition shown in Table 1 and in the same manner as in Example 1 except that the pH of the stock solution forming the film layer B was changed to 4.5. The physical properties and characteristic properties of the obtained film laminate are shown in Table 2.

Example 3

An aromatic polyamide film laminate was obtained in the same manner as in Example 1 except that the diamine component (50 mol % in total) consisted of 37.5 mol % of p-phenylenediamine and 12.5 mol % of 3,4'-diaminodiphenyl ether. The physical properties and characteristic properties of the obtained film laminate are shown in Table 2.

Example 4

An aromatic polyamide film laminate was obtained in the same manner as in Example 1 except that the diamine component (50 mol % in total) consisted of 12.5 mol % of p-phenylenediamine and 37.5 mol % of 3,4'-diaminodiphenyl ether. The physical properties and characteristic properties of the obtained film laminate are shown in Table 2.

Example 5

A stock solution having a pH of 5.5 was prepared by adding a NMP slurry of calcium hydroxide having an average particle diameter of 1,300 nm, while another stock solution having a pH of 4.3 was prepared by adding a NMP slurry of calcium hydroxide having an average particle diameter of 3,000 nm (logarithmic viscosity: 3.5).

An aromatic polyamide film laminate having a final thickness of 20 μm was obtained in the same manner as in Example 2 except that the thickness of each of the two layers was changed to 10 μm and that the particle diameters were changed as shown in Table 1. The physical properties and characteristic properties of the obtained film laminate are shown in Table 2.

Comparative Example 1

An aromatic polyamide film laminate having a final thickness of 4.0 μm was obtained under the condition shown in Table 1 and in the same manner as in Example 1 except that the stretching step was omitted. The physical properties and characteristic properties of the film laminate are shown in Table 2. Since the film laminate was not stretched, sufficient protrusions were not on the surface thereof. Therefore, it has a large friction coefficient and a poor winding property.

Comparative Example 2

An aromatic polyamide film laminate having a final thickness of 4.0 μm was obtained under the condition shown in Table 1 and in the same manner as in Example 1 except that the pH of the film-forming stock solution for the film layer A and that for the film layer B were both changed to 3.6 and that neutralizing agent particles were removed from both of the layers. The physical properties and characteristic properties of the obtained film laminate are shown in Table 2. It is understood that the laminate has poor handling properties.

Comparative Example 3

A film-forming stock solution was prepared in the manner as in Example 1 except that a NMP slurry of calcium hydroxide was ground by a sand grinder to have an average particle diameter of 1,000 nm and filtrated with a 20-μm-mesh filter (HDC II, a product of Nippon Poll Co., Ltd.) to prepare a NMP slurry of calcium hydroxide having an average particle diameter of 350 nm, which was then added to a polymerization system to adjust the pH of the obtained film-forming stock solution to 3.5 and that neutralizing agent particles were removed.

The obtained stock solution was divided into two portions, one of which is supplied to the first layer of a three-layer die and is to the third layer of the die, so that they form both surface layers of the film laminate. A spherical silica having an average particle diameter of 1.5 μm was added to and mixed with the other portion of the stock solution in an amount of 0.3 wt % based on the solid content of the resin, and the resulting mixture was fed into the second layer of the die to be the intermediate layer of the film. An aromatic polyamide film laminate having a final thickness of 5.0 μm (each of the surface layers has a thickness of 1.0 μm) was then prepared in accordance with Example 1. The physical properties and characteristic properties of the film laminate are shown in Table 2. It is understood that the laminate has poor handling properties.

Comparative Example 4

A single-layer aromatic polyamide film having a final thickness of 5.0 μm was obtained using only the film-forming stock solution containing the spherical silica for the second layer in Comparative Example 3 under the condition shown in Table 1. The physical properties and characteristic properties of the film are shown in Table 2. It is understood that the film has poor abrasion resistance because an externally added particles-containing layer is exposed as the outermost layer.

Comparative Example 5

An aromatic polyamide film laminate having a final thickness of 4.0 μm was obtained under the condition shown in Table 1 and in accordance with Example 1 except that the particle diameter of the neutralizing agent before its addition was changed to 22,000 nm and the pH of the film-forming stock solution for the film layer A was adjusted to 4.5 so that coarse protrusions were formed on the surface of the film. The physical properties and characteristic properties of the film laminate are shown in Table 2. It is understood that the laminate has a large void ratio and poor abrasion resistance.

Comparative Example 6

A film-forming stock solution for the film layer A was prepared in the same manner as in Example 2, and a spherical silica having an average particle diameter of 400 nm was added to the stock solution in such an amount that its proportion should be 0.2% of the solid content of the resin. An aromatic polyamide film laminate having a final thickness of 4.0 μm was obtained using the same film layer B and film-forming condition as those used in Example 2. It is understood that the laminate has a large void ratio and poor abrasion resistance because the particles contained in an inorganic particles-containing layer are externally added particles.

TABLE 1

| | | layer A | | | | intermediate layer | | |
|---|---|---|---|---|---|---|---|---|
| | | | particle | | particle | | | |
| | DAPE/PPDA (mol %) | neutralizing agent particles | diameter at the time of addition (nm) | pH | diameter after neutralization (nm) | layer thickness (μm) | neutralizing agent particles | particle diameter (nm) |
| Ex.1 | 25/25 | Ca(OH)$_2$ | 2,000 | 4.7 | 400 | — | — | — |
| Ex.2 | 25/25 | Ca(OH)$_2$ | 2,000 | 4.7 | 400 | — | — | — |
| Ex.3 | 12.5/37.5 | Ca(OH)$_2$ | 2,000 | 4.7 | 400 | — | — | — |
| Ex.4 | 37.5/12.5 | Ca(OH)$_2$ | 2,000 | 4.7 | 400 | — | — | — |
| Ex.5 | 25/25 | Ca(OH)$_2$ | 1,300 | 4.7 | 300 | — | — | — |
| C.Ex.1 | 25/25 | Ca(OH)$_2$ | 2,000 | 4.7 | 400 | — | — | — |
| C.Ex.2 | 25/25 | Ca(OH)$_2$ | 2,000 | 3.6 | particles completely dissolved | — | — | — |
| C.Ex.3 | 25/25 | Ca(OH)$_2$ | 2,000 | 3.5 | particles completely dissolved | 3 | externally added SiO$_2$ | 1,500 |
| C.Ex.4 | 25/25 | — | — | — | — | 5 | externally added SiO$_2$ | 1,500 |
| C.Ex.5 | 25/25 | Ca(OH)$_2$ | 22,000 | 4.5 | 3,500 | — | — | — |
| C.Ex.6 | 25/25 | Ca(OH)$_2$ | 2,000 | 4.7 | externally added SiO$_2$-completely dissolved | — | — | — |

| | layer B | | | film thickness (μm) |
|---|---|---|---|---|
| | neutralizing agent particles | pH | particle diameter after neutralization (nm) | |
| Ex.1 | Ca(OH)$_2$ | 3.8 | particles completely dissolved | 4.0 |
| Ex.2 | Ca(OH)$_2$ | 4.5 | 50 | 4.0 |
| Ex.3 | Ca(OH)$_2$ | 3.8 | particles completely dissolved | 4.0 |
| Ex.4 | Ca(OH)$_2$ | 3.8 | particles completely dissolved | 4.0 |
| Ex.5 | Ca(OH)$_2$ | 3.8 | 400 | 20.0 |
| C.Ex.1 | Ca(OH)$_2$ | 3.8 | particles completely dissolved | 4.0 |
| C.Ex.2 | Ca(OH)$_2$ | 3.6 | particles completely dissolved | 4.0 |
| C.Ex.3 | Ca(OH)$_2$ | 3.5 | particles completely dissolved | 5.0 |
| C.Ex.4 | — | — | — | 5.0 |
| C.Ex.5 | Ca(OH)$_2$ | 3.8 | 50 | 4.0 |
| C.Ex.6 | Ca(OH)$_2$ | 4.5 | 50 | 4.0 |

Ex.: Example C.Ex.: Comparative Example
DAPE: 3,4'-diaminodiphenyl ether
PPDA: p-phenylenediamine externally added SiO$_2$: externally added spherical silica

TABLE 2

| | stretching ratios in longitudinal and transverse directions | area stretch ratio | Surface roughness Ra (nm) | | layer A number of protrusions per mm$^2$ | void ratio |
|---|---|---|---|---|---|---|
| | | | layer A | layer B | | |
| Ex.1 | 2.7 × 2.7 | 7.3 | 12.2 | 0.9 | 18,500 | 1.2 |
| Ex.2 | 2.7 × 2.7 | 7.3 | 12.5 | 1.1 | 18,500 | 1.2 |
| Ex.3 | 2.7 × 2.7 | 7.3 | 12.8 | 1.0 | 18,500 | 1.2 |

TABLE 2-continued

| | | | | | | |
|---|---|---|---|---|---|---|
| Ex.4 | 2.7 × 2.7 | 7.3 | 11.7 | 0.9 | 18,500 | 1.2 |
| Ex.5 | 2.7 × 2.7 | 7.3 | 14.9 | 9.3 | 44,000 | 1.2 |
| C.Ex.1 | 1.0 × 1.0 | 1.0 | 2.5 | 1.0 | impossible to observed | 1.0 |
| C.Ex.2 | 2.7 × 2.7 | 7.3 | 0.7 | 0.7 | — | — |
| C.Ex.3 | 2.7 × 2.7 | 7.3 | 41.1 | 40.8 | — | — |
| C.Ex.4 | 2.7 × 2.7 | 7.3 | 65.9 | 65.3 | 150 | 1.9 |
| C.Ex.5 | 2.7 × 2.7 | 7.3 | 103.5 | 33.5 | 60 | 2.5 |
| C.Ex.6 | 2.7 × 2.7 | 7.3 | 12.5 | 1.0 | 18,500 | 2.2 |

| | Young's modulus (kg/mm$^2$) | | | | | | layer B |
|---|---|---|---|---|---|---|---|
| | in longitudinal direction | in transverse direction | in longitudinal + transverse directions | friction coefficient | winding property | abrasion resistance | number of protrusions per mm$^2$ |
| Ex.1 | 1,250 | 1,250 | 2,500 | ○ | ○ | ○ | — |
| Ex.2 | 1,250 | 1,250 | 2,500 | ⊙ | ○ | ○ | 18,500 |
| Ex.3 | 1,350 | 1,350 | 2,700 | ○ | ⊙ | ○ | — |
| Ex.4 | 1,150 | 1,150 | 2,300 | ○ | ⊙ | ○ | — |
| Ex.5 | 1,250 | 1,250 | 2,500 | ⊙ | ⊙ | ⊙ | 7,500 |
| C.Ex.1 | 600 | 600 | 1,200 | X | X | ○ | — |
| C.Ex.2 | 1,250 | 1,250 | 2,500 | X | XX | ○ | — |
| C.Ex.3 | 1,250 | 1,250 | 2,500 | X | X | ○ | — |
| C.Ex.4 | 1,250 | 1,250 | 2,500 | ⊙ | ○ | X | — |
| C.Ex.5 | 1,250 | 1,250 | 2,500 | ⊙ | ⊙ | X | 18,500 |
| C.Ex.6 | 1,250 | 1,250 | 2,500 | ○ | ○ | X | 18,500 |

Ex.: Example C.Ex.: Comparative Example

Example 6

Twenty five mole percent of p-phenylenediamine and 25 mol % of 3,4'-diaminodiphenyl ether as diamine components and 50 mol % of terephthalic acid chloride as an acid component were polymerized in NMP (N-methyl pyrrolidone).

Meanwhile, a NMP slurry of calcium hydroxide having an average particle diameter of 1,900 nm was prepared by dispersing calcium hydroxide having an average particle diameter of 8,000 nm (a product of Inoue Sekkai Co., Ltd.) in NMP by a homogenizer, grinding the resulting mixture by a sand grinder to have an average particle diameter of 2,800 nm and filtering the resulting particles with a 50-μm-mesh filter (HDC II, a product of Nippon Poll Co., Ltd.).

The above polymer was divided into two portions, and the above NMP slurry was added to one of the two portions of the polymer in such an amount that ensured that 50.2 mol % of calcium hydroxide should correspond with 50 mol % of the terephthalic acid chloride used above, to prepare a film-forming stock solution (A) for the layer A. The film-forming stock solution (A) had a pH of 4.7. This portion of the polymer had a logarithmic viscosity of 3.5.

A film-forming stock solution (B) was prepared for the film layer B by grinding the above slurry of calcium hydroxide by a sand grinder to have an average particle diameter of 900 nm, filtering the resulting particles with a 20-μm-mesh filter (HDC II, a product of Nippon Poll Co., Ltd.) to have an average particle diameter of 600 nm and adding the resulting slurry to the other portion of the polymer in such an amount that ensured that 50.3 mol % of calcium hydroxide should correspond with 50 mol % of the terephthalic acid chloride used above. The film-forming stock solution (B) had a pH of 4.9. This portion of the polymer had a logarithmic viscosity of 3.5.

The obtained film-forming stock solutions (A) and (B) were heated to 100° C. and formed into a laminate of two layers in a cap at 100° C. such that the layer A and the layer B of a product film should have a thickness of 0.5 μm and a thickness of 5.5 μm, respectively. The laminate was cast on a metal belt at 100° C., dried for two minutes at 100° C., and then dried at 120° C. and 150° C. stepwise for 10 minutes in total to obtain an unstretched film laminate having self-holding properties. The unstretched film laminate was obtained with the layer A facing the belt. After the unstretched film laminate was peeled off from the belt continuously and introduced into water bath to remove the solvent and the salt, it was dried at 150° C. for 15 minutes.

The obtained unstretched film laminate was stretched to 2.5 times in a longitudinal direction at 350° C. between low-speed and high-speed rolls, supplied to a tenter, stretched to 3.0 times in a transverse direction at 380° C. to obtain a biaxially oriented film laminate, which was then subjected to heat treatment at 400° C. for one minute to obtain an aromatic polyamide film laminate having a final thickness of 6.0 μm.

The residual particles of the neutralization agents in the film layer A and the film layer B of the obtained film laminate had average particle diameters of 300 nm and 100 nm, respectively. The other constitutions, physical properties of the obtained film laminate and characteristic properties of the coated magnetic tape are shown in Table 4 and Table 5.

Examples 7 to 11

Films having the compositions shown in Table 3 were prepared in accordance with Example 6 and under the conditions shown in Table 2. The physical properties of these aromatic polyamide film laminates and the characteristic properties of the coated magnetic tapes produced therefrom are shown in Table 4 and Table 5.

Example 12

A polymer was prepared by carrying out polymerization in accordance with Example 6 and divided into two portions. To one of them was added a slurry of calcium hydroxide such that the particle diameter of the neutralizing agent particles was to be 1,600 nm at the time of its addition and 300 nm after neutralization, and a film-forming stock solution (A) with a pH of 4.9 was prepared.

To the other portion was added a slurry of calcium hydroxide having an average particle diameter of 1,600 nm w to prepare a film-forming stock solution (C) with a pH of 3.6. No particles derived from the residue of the neutralizing agent were found in the film-forming stock solution (C). A three-layer film laminate having a layer composition of (A)-(C)-(A) (2.5 μm, 4.0 μm, 0.5 μm in thickness, respectively) was prepared in accordance with Example 1 from a three-layer cap using two extruders. The layer having a final thickness of 2.5 μm was taken as the layer A, which was to face a metal belt at the time of casting The physical properties of the obtained film laminate and the characteristic properties of the coated magnetic tape produced therefrom are shown in Table 4 and Table 5.

Example 13

An aromatic polyamide film laminate was obtained in the same manner as in Example 6 except that the diamine component (50 mol % in total) consisted of 37.5 mol % of p-phenylenediamine and 12.5 mol % of 3,4'-diaminodiphenyl ether and that the thicknesses of the layer A and the layer B were changed as shown in Table 3. The physical properties of the film laminate and the characteristic properties of the coated magnetic tape produced therefrom are shown in Table 4 and Table 5.

Example 14

An aromatic polyamide film laminate was obtained in the same manner as in Example 6 except that the diamine component (50 mol % in total) consisted of 12.5 mol % of p-phenylenediamine and 37.5 mol % of 3,4'-diaminodiphenyl ether and that the thicknesses of the layer A and the layer B were changed as shown in Table 3. The physical properties of the film laminate and the characteristic properties of the coated magnetic tape produced therefrom are shown in Table 4 and Table 5.

Comparative Examples 7, 9 and 10

Sample films having the compositions shown in Tables 3 and 4 were prepared in accordance with Example 6 and under the conditions shown in Tables 3 and 4. The physical properties of the film laminate and the characteristic properties of the coated magnetic tape produced therefrom are shown in Table 4 and Table 5.

Comparative Example 8

Taking the film-forming stock solution (C) of Example 12 as the layer A, a film laminate having the composition shown in Tables 3 and 4 was prepared in accordance with Example 6 and under the condition shown in Tables 3 and 4. The physical properties of the film laminate and the characteristic properties of the coated magnetic tape produced therefrom are shown in Table 4 and Table 5.

Comparative Example 11

A film laminate shown in Table 3 was prepared in accordance with Example 6 by dividing the film-forming stock solution (C) of Example 12 into two portions, one of which was mixed with a spherical silica (having a particle diameter of 600 nm) to form a film-forming stock solution for the layer A and the other of which was directly used as a film-forming stock solution for the layer B. The physical properties of the film laminate and the characteristic properties of the coated magnetic tape produced therefrom are shown in Table 4 and Table 5.

TABLE 3

| | | | layer A | | | |
|---|---|---|---|---|---|---|
| | DAPE/PPDA (mol %) | neutralizing agent particles | particle diameter at the time of addition (nm) | pH | particle diameter after neutralization (nm) | layer thickness (μm) |
| Ex.6 | 25/25 | Ca(OH)$_2$ | 1,900 | 4.7 | 300 | 0.5 |
| Ex.7 | 25/25 | Ca(OH)$_2$ | 7,000 | 4.6 | 900 | 0.5 |
| Ex.8 | 25/25 | Ca(OH)$_2$ | 900 | 5.0 | 180 | 1.0 |
| Ex.9 | 25/25 | Ca(OH)$_2$ | 1,900 | 4.7 | 300 | 0.5 |
| Ex.10 | 25/25 | Ca(OH)$_2$ | 1,900 | 4.7 | 300 | 0.5 |
| Ex.11 | 25/25 | CaCO$_3$ | 1,800 | 5.1 | 400 | 1.5 |
| Ex.12 | 25/25 | Ca(OH)$_2$ | 1,600 | 4.9 | 300 | 2.5 |
| Ex.13 | 12.5/37.5 | Ca(OH)$_2$ | 1,900 | 4.7 | 300 | 3.0 |
| Ex.14 | 37.5/12.5 | Ca(OH)$_2$ | 1,900 | 4.7 | 300 | 0.5 |
| C.Ex.7 | 25/25 | Ca(OH)$_2$ | 1,900 | 4.7 | 300 | 0.5 |
| C.Ex.8 | 25/25 | Ca(OH)$_2$ | 1,900 | 3.6 | particles completely dissolved | 0.5 |
| C.Ex.9 | 25/25 | Ca(OH)$_2$ | 20,500 | 4.4 | 2,500 | 0.5 |
| C.Ex.10 | 25/25 | Ca(OH)$_2$ | 320 | 7.0 | 50 | 0.5 |
| C.Ex.11 | 25/25 | Ca(OH)$_2$ | 1,900 | 3.6 | externally added SiO$_2$: 600 | 0.5 |

| | layer B | | | | | | | |
|---|---|---|---|---|---|---|---|---|
| | intermediate layer | | | | particle diameter at the time of addition (nm) | | | |
| | neutralizing agent particles | particle diameter (nm) | layer thickness (μm) | neutralizing agent particles | | pH | particle diameter after neutralization (nm) | layer thickness (μm) | film thickness (μm) |
| Ex.6 | — | — | — | Ca(OH)$_2$ | 600 | 4.9 | 100 | 5.5 | 6.0 |
| Ex.7 | — | — | — | Ca(OH)$_2$ | 500 | 4.8 | 80 | 3.5 | 4.0 |
| Ex.8 | — | — | — | Ca(OH)$_2$ | 900 | 5.0 | 150 | 3.0 | 4.0 |

TABLE 3-continued

| | | | | | | | | | |
|---|---|---|---|---|---|---|---|---|---|
| Ex.9 | — | — | — | Ca(OH)$_2$ | 600 | 4.9 | 100 | 3.5 | 4.0 |
| Ex.10 | — | — | — | Ca(OH)$_2$ | 600 | 4.9 | 100 | 2.5 | 3.0 |
| Ex.11 | — | — | — | CaCO$_3$ | 600 | 4.9 | 100 | 2.5 | 4.0 |
| Ex.12 | — | — | 4.0 | Ca(OH)$_2$ | 1,600 | 4.9 | 300 | 0.5 | 7.0 |
| Ex.13 | — | — | — | Ca(OH)$_2$ | 600 | 4.9 | 100 | 6.0 | 9.0 |
| Ex.14 | — | — | — | Ca(OH)$_2$ | 600 | 4.9 | 100 | 4.0 | 4.5 |
| C.Ex.7 | — | — | — | Ca(OH)$_2$ | 600 | 4.9 | 100 | 3.5 | 4.0 |
| C.Ex.8 | — | — | — | Ca(OH)$_2$ | 200 | 4.6 | 30 | 3.5 | 4.0 |
| C.Ex.9 | — | — | — | Ca(OH)$_2$ | 600 | 4.9 | 100 | 3.5 | 4.0 |
| C.Ex.10 | — | — | — | Ca(OH)$_2$ | 200 | 4.6 | 30 | 3.5 | 4.0 |
| C.Ex.11 | — | — | — | Ca(OH)$_2$ | 1,900 | 3.6 | particle completely dissolved | 3.5 | 4.0 |

Ex.: Example C.Ex.: Comparative Example
DAPE: 3,4'-diaminodiphenyl ether
PPDA: p-phenylenediamine externally added SiO$_2$: externally added spherical silica

TABLE 4

| | stretch ratio | | | surface roughness Ra (nm) | | layer A | | Layer B |
|---|---|---|---|---|---|---|---|---|
| | stretching ratios in longitudinal and transverse directions | area stretch ratio | | layer A | layer B | number of protrusions per mm$^2$ | void ratio | number of protrusions per mm$^2$ |
| Ex.6 | 2.5 × 3.0 | 7.5 | | 4.2 | 1.9 | 14,500 | 1.05 | 80,000 |
| Ex.7 | 2.5 × 3.0 | 7.5 | | 12.3 | 2.5 | 430 | 1.10 | 106,000 |
| Ex.8 | 2.5 × 3.0 | 7.5 | | 6.1 | 2.1 | 54,000 | 1.02 | 33,000 |
| Ex.9 | 2.0 × 3.5 | 7.0 | | 4.8 | 2.0 | 12,000 | 1.04 | 78,000 |
| Ex.10 | 2.8 × 2.8 | 7.8 | | 5.5 | 2.0 | 16,500 | 1.05 | 85,000 |
| Ex.11 | 2.5 × 3.0 | 7.5 | | 10.8 | 2.5 | 34,000 | 1.03 | 66,000 |
| Ex.12 | 2.5 × 3.0 | 7.5 | | 7.8 | 4.5 | 22,000 | 1.01 | 22,000 |
| Ex.13 | 2.5 × 3.0 | 7.5 | | 7.5 | 2.3 | 14,500 | 1.02 | 80,000 |
| Ex.14 | 2.5 × 3.0 | 7.5 | | 4.4 | 2.0 | 14,500 | 1.03 | 80,000 |
| C.Ex.7 | 1.0 × 1.0 | 1.0 | | 2.1 | 1.8 | impossible to observe | 1.00 | impossible to observe |
| C.Ex.8 | 2.5 × 3.0 | 7.5 | | 1.5 | 3.1 | — | — | 230,000 |
| C.Ex.9 | 2.5 × 3.0 | 7.5 | | 32.7 | 7.7 | 20 | 2.25 | 80,000 |
| C.Ex.10 | 2.5 × 3.0 | 7.5 | | 4.8 | 3.2 | 1,250,000 | 1.03 | 230,000 |
| C.Ex.11 | 2.5 × 3.0 | 7.5 | | 6.6 | 2.2 | 3,000 | 2.40 | — |

Ex.: Example C.Ex.: Comparative Example

TABLE 5

| | total of Young's moduli in longitudinal and transverse directions (kg/mm$^2$) | flexural rigidity (mg · mm) | break strength in a longitudinal direction (kg/mm$^2$) | maximum thermal shrinkage factor (%) | air vent index (mmHg/hr) | winding property | abrasion resistance of layer A |
|---|---|---|---|---|---|---|---|
| Ex.6 | 2,500 | 7.0 | 45 | 0.3 | 4.5 | ○ | ◉ |
| Ex.7 | 2,500 | 7.0 | 45 | 0.3 | 13.7 | ◉ | ○ |
| Ex.8 | 2,500 | 7.0 | 45 | 0.3 | 6.1 | ○ | ◉ |
| Ex.9 | 2,350 | 5.6 | 42 | 0.3 | 5.5 | ○ | ◉ |
| Ex.10 | 2,600 | 7.8 | 49 | 0.3 | 8.2 | ○ | ◉ |
| Ex.11 | 2,500 | 7.0 | 45 | 0.3 | 11.8 | ◉ | ○ |
| Ex.12 | 2,500 | 7.0 | 45 | 0.3 | 9.3 | ◉ | ◉ |
| Ex.13 | 2,800 | 7.1 | 49 | 0.1 | 8.4 | ○ | ◉ |
| Ex.14 | 2,300 | 6.9 | 42 | 0.5 | 4.2 | ○ | ◉ |
| C.Ex.7 | 1,200 | 4.2 | 22 | 1.2 | 2.2 | X | ○ |
| C.Ex.8 | 2,500 | 7.0 | 45 | 0.3 | 1 | XX | ◉ |
| C.Ex.9 | 2,500 | 7.0 | 45 | 0.3 | 37.6 | ◉ | X |
| C.Ex.10 | 2,500 | 7.0 | 45 | 0.3 | 2.9 | X | X |
| C.Ex.11 | 2,500 | 7.0 | 45 | 0.3 | 8.3 | ◉ | X |

TABLE 5-continued

|  | running friction coefficient of layer B (film against pin) | C/N (A) | drop-outs | Running durability |
|---|---|---|---|---|
| Ex.6 | ○ | ◎ | ○ | ○ |
| Ex.7 | ○ | ○ | ○ | ○ |
| Ex.8 | ○ | ◎ | ○ | ○ |
| Ex.9 | ○ | ◎ | ○ | ○ |
| Ex.10 | ○ | ◎ | ○ | ○ |
| Ex.11 | ○ | ○ | ○ | ○ |
| Ex.12 | ◎ | ○ | ○ | ○ |
| Ex.13 | ○ | ○ | ○ | ○ |
| Ex.14 | ○ | ◎ | ○ | ○ |
| C.Ex.7 | X | X | ○ | X |
| C.Ex.8 | ○ | ◎ | ○ | X |
| C.Ex.9 | ◎ | X | X | ○ |
| C.Ex.10 | ○ | ◎ | X | ○ |
| C.Ex.11 | X | ◎ | X | X |

Ex.: Example  C.Ex.: Comparative Example

Example 15

Twenty five mole percent of p-phenylenediamine and 25 mol % of 3,4'-diaminodiphenyl ether as diamine components and 50 mol % of terephthalic acid chloride as an acid component were polymerized in NMP (N-methyl pyrrolidone). Meanwhile, a NMP slurry of calcium hydroxide having an average particle diameter of 2,500 nm was prepared for the layer A by dispersing calcium hydroxide having an average particle diameter of 8,000 nm (a product of Inoue Sekkai Co., Ltd.) in NMP by a homogenizer, grinding the resulting mixture by a sand grinder to have an average particle diameter of 4,000 nm and filtering the resulting particles with a 50-μm-mesh filter (HDC II, a product of Nippon Poll Co., Ltd.). Then, a NMP slurry of calcium hydroxide having an average particle diameter of 700 nm was prepared as a neutralizing agent for the layer B by grinding the above slurry by a sand grinder to have an average particle diameter of 1,000 nm and filtering the resulting particles with a 20-μm-mesh filter (HDC II, a product of Nippon Poll Co., Ltd.). The above polymer was divided into two portions, and the slurry having an average particle diameter of 2,500 nm was added to one of the two portions of the polymer and the slurry having an average particle diameter of 700 nm to the other portion of the polymer in such amounts that ensured that 50.2 mol % of calcium hydroxide and 50.1 mol % of calcium hydroxide should correspond with 50 mol % of the terephthalic acid chloride used above, to prepare a film-forming stock solution (A) for the film layer (A) and a film-forming stock solution (B) for the film layer (B). The film-forming stock solution (A) had a pH of 4.7 while the film-forming stock solution (B) had a pH of 4.5. Each of the two portions of the polymer had a logarithmic viscosity of 3.5.

The obtained film-forming stock solutions (A) and (B) were heated to 100° C. and formed into a laminate of two layers in a cap at 100° C. such that the layer A and the layer B of a product film should have a thickness of 1.0 μm and a thickness of 3.0 μm, respectively. The laminate was cast on a metal belt at 100° C., dried for two minutes at 100° C., and then dried at 120° C. and 150° C. stepwise for 10 minutes in total to obtain an unstretched film laminate having self-holding properties. The unstretched film was obtained with the layer A facing the belt. After the unstretched film laminate was peeled off from the belt continuously and introduced into water bath to remove the solvent and the salt, it was dried at 180° C. for three minutes.

The obtained unstretched film laminate was stretched to 2.5 times in a longitudinal direction at 350° C. between low-speed and high-speed rolls, supplied to a tenter, stretched to 3.0 times in a transverse direction at 380° C. to obtain a biaxially oriented film, which was then subjected to heat treatment at 400° C. for one minute to obtain an aromatic polyamide film laminate having a final thickness of 4.0 μm.

The residual particles of the neutralization agents in the film layer A and the film layer B of the obtained film laminate had average particle diameters of 400 nm and 100 nm, respectively. Physical properties of the obtained film laminate and characteristic properties of the metal thin film magnetic tape are shown in Table 6 and Table 7.

Examples 16 to 23

Aromatic polyamide film laminates were obtained under the conditions shown in Table 6 and Table 7 and in accordance with Example 15. The physical properties of these film laminates and the characteristic properties of the metal thin film magnetic tapes produced from these film laminate are shown in Table 6 and Table 7.

Comparative Example 12

An aromatic polyamide film laminate having a final thickness of 4.0 μm was obtained in the same manner as in Example 15 except that stretching was not carried out. The physical properties of the obtained film laminate and the characteristic properties of the metal thin film magnetic tape produced from these film laminate are shown in Table 6 and Table 7.

Comparative Example 13

A film-forming stock solution (B) was prepared in the same manner as in Example 15 except that the polymer for the layer B was not neutralized. After a laminate of the layer A and the layer B was cast on a metal belt and dried in the same manner as in Example 15 until it acquired self-holding properties, the laminate was further dried at 180° C. for five minutes without being treated with water and stretched and subjected to heat treatment in the same manner as in Example 15 to obtain an aromatic polyamide film laminate having a final thickness of 4.0 μm. The physical properties of the obtained film laminate and the characteristic proper-ties of the metal thin film magnetic tape produced from the film laminate are shown in Table 6 and Table 7. Since the film laminate was not treated with water, chlorine ions remained, causing poor heat-and-humidity stability.

Comparative Examples 14 and 15

Aromatic polyamide film laminates were obtained under the conditions shown in Table 6 and Table 7 and in accordance with Example 15. The physical properties of these film laminates and the characteristic properties of the metal thin film magnetic tapes produced from these film laminates are shown in Table 6 and Table 7. In Comparative Example 14, the obtained film laminate had poor abrasion resistance because particles contained in the layer A were too large in size and large protrusions were transferred to the metal thin film, so that the obtained tape had poor electromagnetic conversion characteristics. In Comparative Example 15, on the other hand, the abrasion resistance of the layer B of the obtained film laminate was poor because the surface of the layer B was too rough, and the obtained magnetic tape had poor electromagnetic conversion characteristics.

Comparative Example 16

A magnetic tape was prepared by forming a metal thin film layer on the layer A of the film laminate of Example 15 and forming a back coat layer on the layer B thereof. The physical properties of the obtained film laminate and the characteristic properties of the metal thin film magnetic tape produced from the film laminate are shown in Table 6 nd Table 7. The tape had poor electromagnetic conversion characteristics because the film surface on which the metal thin film layer had been formed was rough.

Comparative Example 17

A polymer solution prepared to obtain a film-forming stock solution having a pH of 3.6 was neutralized by using calcium hydroxide having an average particle diameter of 700 nm as a neutralizing agent. The neutralized polymer was divided into two portions. A film-forming stock solution (A) and a film-forming stock solution (B) were prepared by adding a spherical silica having an average particle diameter of 500 nm to one of the two portions of the polymer and a slurry prepared by dispersing a spherical silica having an average particle diameter of 20 nm in NMP to the other portion of the polymer, respectively. Thereafter, an aromatic polyamide film laminate was obtained in accordance with Example 15. The physical properties of this film and the characteristic properties of the metal thin film magnetic tape produced from this film are shown in Table 6 and Table 7. The residue of the neutralizing agent was not found in the obtained film.

The spherical silica added caused the formation of large voids in the layer A and many agglomerates in the layer B. Therefore, both of the layers had poor abrasion resistance.

TABLE 6

| | | | layer A | | | |
|---|---|---|---|---|---|---|
| | DAPE/PPDA (mol %) | neutralizing agent particles | particle diameter at the time of addition (nm) | pH | particle diameter after neutralization (nm) | layer thickness ($\mu$m) |
| Ex.15 | 25/25 | Ca(OH)$_2$ | 2,500 | 4.7 | 400 | 1.0 |
| Ex.16 | 25/25 | Ca(OH)$_2$ | 3,500 | 4.6 | 500 | 2.0 |
| Ex.17 | 25/25 | Ca(OH)$_2$ | 3,500 | 4.6 | 500 | 0.5 |
| Ex.18 | 25/25 | CaCO$_3$ | 4,200 | 4.6 | 600 | 0.2 |
| Ex.19 | 25/25 | CaCO$_3$ | 800 | 4.9 | 200 | 2.0 |
| Ex.20 | 25/25 | CaCO$_3$ | 7,000 | 4.5 | 800 | 2.0 |
| Ex.21 | 25/25 | Mg(OH)$_2$ | 3,700 | 4.6 | 500 | 1.0 |
| Ex.22 | 35/15 | CaCO$_3$ | 2,800 | 4.6 | 400 | 1.0 |
| Ex.23 | 15/35 | CaCO$_3$ | 2,900 | 4.6 | 400 | 1.0 |
| C.Ex.12 | 25/25 | Ca(OH)$_2$ | 2,500 | 4.7 | 400 | 1.0 |
| C.Ex.13 | 25/25 | Ca(OH)$_2$ | 2,500 | 4.7 | 400 | 1.0 |
| C.Ex.14 | 25/25 | CaCO$_3$ | 20,100 | 4.5 | 2,100 | 1.0 |
| C.Ex.15 | 25/25 | Ca(OH)$_2$ | 2,500 | 4.7 | 400 | 1.0 |
| C.Ex.16 | 25/25 | Ca(OH)$_2$ | 700 | 4.5 | 100 | 3.0 |
| C.Ex.17 | 25/25 | Ca(OH)$_2$ | 700 | 3.6 | externally added SiO$_2$: 500 completely dissolved | 0.5 |

| | | layer B | | | | |
|---|---|---|---|---|---|---|
| | neutralizing agent particles | particle diameter at the time of addition (nm) | pH | particle diameter after neutralization (nm) | layer thickness ($\mu$m) | film thickness ($\mu$m) |
| Ex.15 | Ca(OH)$_2$ | 700 | 4.5 | 100 | 3.0 | 4.0 |
| Ex.16 | Ca(OH)$_2$ | 130 | 4.7 | 20 | 2.0 | 4.0 |
| Ex.17 | CaCo$_3$ | 300 | 4.5 | 40 | 2.5 | 3.0 |
| Ex.18 | Ca(OH)$_2$ | 600 | 4.4 | 70 | 1.8 | 2.0 |
| Ex.19 | CaCo$_3$ | 800 | 4.4 | 100 | 4.0 | 6.0 |
| Ex.20 | Mg(OH)$_2$ | 440 | 4.7 | 80 | 6.0 | 8.0 |
| Ex.21 | MgCo$_3$ | 1,000 | 4.5 | 120 | 3.0 | 4.0 |

TABLE 6-continued

| | | | | | | |
|---|---|---|---|---|---|---|
| Ex.22 | Ca(OH)$_2$ | 160 | 4.6 | 20 | 3.0 | 4.0 |
| Ex.23 | CaCo$_3$ | 1,600 | 4.4 | 150 | 3.0 | 4.0 |
| C.Ex.12 | Ca(OH)$_2$ | 700 | 4.5 | 100 | 3.0 | 4.0 |
| C.Ex.13 | not neutralized | — | 2.3 | — | 3.0 | 4.0 |
| C.Ex.14 | Ca(OH)$_2$ | 700 | 4.5 | 100 | 3.0 | 4.0 |
| C.Ex.15 | Ca(OH)$_2$ | 180 | 11.0 | 100 | 3.0 | 4.0 |
| C.Ex.16 | Ca(OH)$_2$ | 2,500 | 4.7 | 400 | 1.0 | 4.0 |
| C.Ex.17 | Ca(OH)$_2$ | 700 | 3.6 | externally added SiO$_2$: 20 completely dissolved | 3.5 | 4.0 |

Ex.: Example C.Ex : Comparative Example
DAPE: 3,4'-diaminodiphenyl ether
PPDA: p-phenylenediamine externally added SiO$_2$: externally added spherical silica

TABLE 7

| | stretching ratios in longitudinal and transverse directions | area stretch ratio | Young's moduli in longitudinal and transverse directions (kg/mm$^2$) | surface roughness Ra (nm) | | layer A | | number of protrusions per mm$^2$ in layer B |
|---|---|---|---|---|---|---|---|---|
| | | | | layer A | layer B | number of protrusions per mm$^2$ | void ratio | |
| Ex.15 | 2.5 × 3.0 | 7.50 | 2,500 | 6.2 | 1.2 | 10,000 | 1.07 | 38,000 |
| Ex.16 | 2.0 × 3.5 | 7.00 | 2,600 | 7.3 | 1.0 | 6,300 | 1.05 | 375,000 |
| Ex.17 | 2.2 × 3.3 | 7.26 | 2,500 | 3.5 | 1.0 | 3,900 | 1.05 | 98,000 |
| Ex.18 | 2.5 × 3.0 | 7.50 | 2,500 | 7.5 | 0.9 | 920 | 1.03 | 33,000 |
| Ex.19 | 2.5 × 3.0 | 7.50 | 2,500 | 8.4 | 1.2 | 96,000 | 1.01 | 31,000 |
| Ex.20 | 2.5 × 3.0 | 7.50 | 2,500 | 6.6 | 1.5 | 1,800 | 1.08 | 87,000 |
| Ex.21 | 2.5 × 3.0 | 7.50 | 2,500 | 6.2 | 1.3 | 3,900 | 1.03 | 17,000 |
| Ex.22 | 2.5 × 3.0 | 7.50 | 2,500 | 5.4 | 0.9 | 8,400 | 1.05 | 187,000 |
| Ex.23 | 2.0 × 3.0 | 6.00 | 2,500 | 5.5 | 1.2 | 8,400 | 1.05 | 8,200 |
| C.Ex.12 | 1.0 × 1.0 | 1.00 | 1,200 | 2.5 | 1.0 | impossible to observe | 1.00 | impossible to observe |
| C.Ex.13 | 2.5 × 3.0 | 7.50 | 2,500 | 6.1 | 0.6 | 10,000 | 1.07 | 0 |
| C.Ex.14 | 2.5 × 3.0 | 7.50 | 2,500 | 21.3 | 8.8 | 40 | 2.20 | 38,000 |
| C.Ex.15 | 2.5 × 3.0 | 7.50 | 2,500 | 8.3 | 11.5 | 10,000 | 1.07 | 2,700,000 |
| C.Ex.16 | 2.5 × 3.0 | 7.50 | 2,500 | 1.2 | 6.3 | 38,000 | 1.01 | 10,000 |
| C.Ex.17 | 2.5 × 3.0 | 7.50 | 2,500 | 4.7 | 1.1 | 3,900 | 2.10 | 132,000 |

| | Detection of halogen ions | friction coefficient | abrasion resistance against pin | | C/N (B) | running durability | heat and humidity stability | organic solvent |
|---|---|---|---|---|---|---|---|---|
| | | | layer A | layer B | | | | |
| Ex.15 | ○ | ○ | ○ | ○ | ○ | ○ | ○ | 3 |
| Ex.16 | ○ | ⊙ | ○ | ○ | ⊙ | ○ | ○ | 2 |
| Ex.17 | ○ | ○ | ○ | ⊙ | ⊙ | ⊙ | ○ | 1 |
| Ex.18 | ○ | ○ | ○ | ○ | ⊙ | ○ | ○ | 2 |
| Ex.19 | ○ | ○ | ○ | ○ | ○ | ○ | ○ | 5 |
| Ex.20 | ○ | ⊙ | ⊙ | ○ | ○ | ○ | ○ | 10 |
| Ex.21 | ○ | ○ | ○ | ⊙ | ○ | ○ | ○ | 3 |
| Ex.22 | ○ | ○ | ○ | ○ | ⊙ | ○ | ○ | 1 |
| Ex.23 | ○ | ○ | ○ | ⊙ | ○ | ⊙ | ○ | 1 |
| C.Ex.12 | ○ | X | ○ | ○ | X | X | ○ | 8 |
| C.Ex.13 | X | ○ | ○ | ○ | ⊙ | X | X | 800 |
| C.Ex.14 | ○ | ⊙ | X | ○ | X | ⊙ | ○ | 2 |
| C.Ex.15 | ○ | ○ | ○ | X | X | ○ | ○ | 2 |
| C.Ex.16 | ○ | ○ | ○ | ○ | X | ⊙ | ○ | 2 |
| C.Ex.17 | ○ | ○ | X | X | ○ | ○ | ○ | 2 |

Ex.: Example C.Ex.: Comparative Example

Example 24

Twenty five mole percent of p-phenylenediamine and 25 mol % of 3,4'-diaminodiphenyl ether as diamine components and 50 mol % of terephthalic acid chloride as an acid component were polymerized in NMP (N-methyl pyrrolidone). Meanwhile, a NMP slurry of calcium hydroxide having an average particle diameter of 3,800 nm was prepared for the layer A by dispersing calcium hydroxide having an average particle diameter of 8,000 nm (a product of Inoue Sekkai Co., Ltd.) in NMP by a homogenizer, grinding the resulting mixture by a sand grinder to have an average particle diameter of 5,000 nm and filtering the resulting particles with a 50-μm-mesh filter (HDC II, a product of Nippon Poll Co., Ltd.). Then, a NMP slurry of calcium hydroxide having an average particle diameter of 800 nm was prepared as a neutralizing agent for the layer B by grinding the above slurry by a sand grinder to have an average particle diameter of 1,000 nm and filtering the resulting particles with a 20-μm-mesh filter (HDC II, a product of Nippon Poll Co., Ltd.). The above polymer was divided into two portions, and the slurry having an average particle diameter of 3,800 nm was added to one of the two portions of the polymer and the slurry having an average particle diameter of 800 nm to the other portion of the polymer in such amounts that ensured that 48.1 mol % of calcium hydroxide and 50.2 mol % of calcium hydroxide should correspond with 50 mol % of the terephthalic acid chloride used above, to prepare a film-forming stock solution (A) for the film layer (A) and a film-forming stock solution (B) for the film layer (B). The film-forming stock solution (A) had a pH of 4.7 while the film-forming stock solution (B) had a pH of 3.7. Each of the two portions of the polymer had a logarithmic viscosity of 3.5.

The obtained film-forming stock solutions (A) and (B) were heated to 100° C., filtered with a 3-μm-mesh filter, formed into a laminate of two layers in a cap at 100° C. such that the layer A and the layer B of a product film should have a thickness of 1.0 μm and a thickness of 3.0 μm, respectively. The laminate was cast on a metal belt at 100° C., dried for two minutes at 100° C., and then dried at 120° C. and 150° C. stepwise for 10 minutes in total to obtain an unstretched film laminate having self-holding properties. The unstretched film was obtained with the layer A facing the belt. After the unstretched film laminate was peeled off from the belt continuously and introduced into water bath to remove the solvent and the salt, it was dried at 180° C. for three minutes.

The obtained unstretched film laminate was stretched to 2.5 times in a longitudinal direction at 350° C. between low-speed and high-speed rolls, supplied to a tenter, stretched to 3.0 times in a transverse direction at 380° C. to obtain a biaxially oriented film laminate, which was then subjected to heat treatment at 400° C. for one minute to obtain an aromatic polyamide film laminate having a final thickness of 4.0 μm.

In the obtained film laminate, the particles of the neutralization agent added in the film layer B were completely dissolved while those in the film layer A had an average particle diameter of 600 nm. Physical properties of the obtained film laminate and characteristic properties of the metal thin film magnetic tape produced from the film laminate are shown in Table 8 and Table 9.

Examples 25 to 32

Aromatic polyamide film laminates were prepared under the conditions shown in Table 8 and Table 9 and in accordance with Example 24. The ratio of the total number of moles of the two diamine components to the number of moles of terephthalic acid dichloride was adjusted to be 1:1. The physical properties of these films and the characteristic properties of the metal thin film magnetic tapes produced from these films are shown in Table 8 and Table 9.

Comparative Example 18

The film-forming stock solution (B) of Example 24 was divided into two portions. Then, a film-forming stock solution (B) was formed by adding a spherical silica having an average particle diameter of 600 nm to one of the two portions of the solution (B), and an aromatic polyamide film laminate having a final thickness of 4 μm was obtained in the same manner as in Example 24. The physical properties of the obtained film laminate and the characteristic properties of the metal thin film magnetic tape produced from the film laminate are shown in Table 8 and Table 9. Since the particles contained were externally added particles, voids were formed around the particles due to the lack of affinity of the particles for the film and caused particles to fall off, whereby frequent drop-outs occurred.

Comparative Example 19

An aromatic polyamide film laminate having a final thickness of 4.0 μm was obtained in the same manner as in Example 24 except that stretching was not carried out. The physical properties of the obtained film laminate and the characteristic properties of the metal thin film magnetic tape produced from the film laminate are shown in Table 8 and Table 9. Since stretching was not carried out, sufficient protrusions were not formed, with the result of a poor winding property. Electromagnetic conversion characteristics were also poor due to insufficient Young's module.

Comparative Example 20

An aromatic polyamide film laminate having a final thickness of 4.0 μm was obtained by casting a laminate of the layer A and the layer B on a metal belt in the same manner as in Example 24 using a neutralizing agent shown in Table 8, drying the laminate in the same manner as in Example 24 until it acquired self-holding properties, further drying the laminate at 180° C. for five minutes without being treated with water, and stretching the laminate and subjecting the stretched laminate to heat treatment in the same manner as in Example 24. The physical properties of the obtained film laminate and the characteristic properties of the metal thin film magnetic tape produced from the film laminate are shown in Table 8 and Table 9. Since the film laminate was not treated with water, chlorine ions remained, causing poor heat-and-humidity stability.

Comparative Example 21 and 22

Aromatic polyamide film laminates were obtained under the conditions shown in Table 8 and Table 9 and in accordance with Example 24. The physical properties of the obtained film laminates and the characteristic properties of the metal thin film magnetic tapes produced from these film laminates are shown in Table 8 and Table 9. In Comparative Example 21, the air-venting property of the film laminate and the winding properties of the film laminate and the tape were both poor since the particles contained in the layer A are too small in size. In Comparative Example 22, on the other hand, since the surface of the layer A was too rough, the electromagnetic conversion characteristics of the tape were poor and drop-outs occurred frequently.

TABLE 8

| | | layer A | | | | |
|---|---|---|---|---|---|---|
| | DAPE/PPDA (mol %) | neutralizing agent particles | particle diameter at the time of addition (nm) | pH | particle diameter after neutralization (nm) | layer thickness (μm) |
| Ex.24 | 25/25 | Ca(OH)₂ | 3,800 | 4.7 | 600 | 1.0 |
| Ex.25 | 25/25 | Ca(OH)₂ | 800 | 5.0 | 200 | 1.0 |
| Ex.26 | 25/25 | CaCO₃ | 6,000 | 4.8 | 700 | 0.3 |
| Ex.27 | 25/25 | CaCO₃ | 700 | 4.9 | 150 | 3.0 |
| Ex.28 | 25/25 | Ca(OH)₂ | 9,500 | 4.8 | 1,000 | 0.5 |
| Ex.29 | 35/15 | Ca(OH)₂ | 1,100 | 5.2 | 300 | 2.0 |
| Ex.30 | 15/35 | Ca(OH)₂ | 3,800 | 4.7 | 600 | 2.0 |
| Ex.31 | 25/25 | Ca(OH)₂ | 3,800 | 4.7 | 600 | 1.5 |
| Ex.32 | 25/25 | CaCO₃ | 2,500 | 4.8 | 400 | 1.5 |
| C.Ex.18 | 25/25 | Ca(OH)₂ | 800 | 3.7 | externally added SiO₂: 600 completely dissolved | 1.0 |
| C.Ex.19 | 25/25 | Ca(OH)₂ | 3,800 | 4.7 | 600 | 1.0 |
| C.Ex.20 | 25/25 | Ca(OH)₂ | 3,800 | 4.7 | 600 | 1.0 |
| C.Ex.21 | 25/25 | CaCO₃ | 260 | 4.8 | 30 | 1.0 |
| C.Ex.22 | 25/25 | Ca(OH)₂ | 1,800 | 5.9 | 600 | 1.0 |

| | layer B | | | | | |
|---|---|---|---|---|---|---|
| | neutralizing agent particles | particle diameter at the time of addition (nm) | pH | particle diameter after neutralization (nm) | layer thickness (μm) | film thickness (μm) |
| Ex.24 | Ca(OH)₂ | 800 | 3.7 | particles completely dissolved | 3.0 | 4.0 |
| Ex.25 | CaCo₃ | 700 | 3.8 | particles completely dissolved | 3.0 | 4.0 |
| Ex.26 | LiOH | 1,000 | 3.6 | particles completely dissolved | 2.7 | 3.0 |
| Ex.27 | LiOH | 1,000 | 4.5 | particles completely dissolved | 2.0 | 5.0 |
| Ex.28 | LiOH | 1,000 | 4.1 | particles completely dissolved | 6.5 | 7.0 |
| Ex.29 | Mg(OH)₂ | 700 | 3.9 | particles completely dissolved | 2.0 | 4.0 |
| Ex.30 | MgCo₃ | 500 | 4.1 | particles completely dissolved | 2.0 | 4.0 |
| Ex.31 | Li₂Co₃ | 1,000 | 4.0 | particles completely dissolved | 2.5 | 4.0 |
| Ex.32 | Li₂Co₃ | 1,000 | 4.0 | particles completely dissolved | 2.5 | 4.0 |
| C.Ex.18 | Ca(OH)₂ | 800 | 3.7 | particles completely dissolved | 3.0 | 4.0 |
| C.Ex.19 | Ca(OH)₂ | 800 | 3.7 | particles completely dissolved | 3.0 | 4.0 |
| C.Ex.20 | LiOH | 1,000 | 4.3 | particles completely dissolved | 3.0 | 4.0 |
| C.Ex.21 | CaCo₃ | 700 | 4.0 | particles completely dissolved | 3.0 | 4.0 |
| C.Ex.22 | Li₂Co₃ | 1,000 | 3.5 | particles completely dissolved | 3.0 | 4.0 |

Ex.: Example C.Ex.: Comparative Example
DAPE: 3,4'-diaminodiphenyl ether
PPDA: p-phenylenediamine externally added SiO₂: externally added spherical silica

TABLE 9

| | stretching ratios in longitudinal and transverse directions | area stretch ratio | Young's moduli in longitudinal and transverse directions (kg/mm²) | surface roughness Ra (nm) | | layer A | | detection of halogen ions in layer B (ng/mm²) |
|---|---|---|---|---|---|---|---|---|
| | | | | layer A | layer B | number of protrusions per mm² | void ratio | |
| Ex.24 | 2.5 × 3.0 | 7.50 | 2,500 | 8.0 | 0.9 | 5,500 | 1.07 | ○ |
| Ex.25 | 2.8 × 2.8 | 7.84 | 2,800 | 5.0 | 0.7 | 95,000 | 1.03 | ○ |
| Ex.26 | 3.0 × 2.5 | 7.50 | 2,500 | 6.5 | 0.6 | 400 | 1.09 | ○ |
| Ex.27 | 2.0 × 3.0 | 6.00 | 2,300 | 4.8 | 1.1 | 96,000 | 1.01 | ○ |
| Ex.28 | 2.5 × 2.5 | 6.25 | 2,400 | 10.4 | 0.7 | 160 | 1.10 | ○ |
| Ex.29 | 2.5 × 3.0 | 7.50 | 2,400 | 12.5 | 0.8 | 73,000 | 1.02 | ○ |
| Ex.30 | 2.5 × 3.0 | 7.50 | 2,700 | 8.5 | 1.1 | 6,300 | 1.08 | ○ |
| Ex.31 | 2.5 × 3.0 | 7.50 | 2,400 | 8.2 | 1.0 | 6,300 | 1.05 | ○ |
| Ex.32 | 2.5 × 3.5 | 8.75 | 2,600 | 6.2 | 0.9 | 12,600 | 1.04 | ○ |
| C.Ex.18 | 2.5 × 3.0 | 7.50 | 2,500 | 7.4 | 1.0 | 5,500 | 2.35 | ○ |
| C.Ex.19 | 1.0 × 1.0 | 1.00 | 1,100 | 3.1 | 0.7 | impossible to observe | 1.00 | ○ |
| C.Ex.20 | 2.5 × 3.0 | 7.50 | 2,500 | 7.7 | 0.8 | 5,500 | 1.07 | X |

TABLE 9-continued

| | | | | | | | | |
|---|---|---|---|---|---|---|---|---|
| C.Ex.21 | 2.5 × 3.0 | 7.50 | 2,500 | 0.8 | 0.5 | 9,400 | 1.00 | ○ |
| C.Ex.22 | 2.5 × 3.0 | 7.50 | 2,500 | 25.5 | 10.2 | 63,000 | 1.08 | ○ |

| | air vent index (mmHg/hr) | winding property | C/N (A) or (B) | drop-outs | heat and humidity stability | organic solvent (ppm) |
|---|---|---|---|---|---|---|
| Ex.24 | 5.0 | ○ | ○ | ○ | ○ | 2 |
| Ex.25 | 3.2 | ○ | ◎ | ◎ | ○ | 4 |
| Ex.26 | 7.4 | ◎ | ○ | ○ | ○ | 1 |
| Ex.27 | 2.6 | ○ | ◎ | ○ | ○ | 3 |
| Ex.28 | 8.4 | ◎ | ○ | ○ | ○ | 7 |
| Ex.29 | 6.0 | ○ | ○ | ◎ | ○ | 2 |
| Ex.30 | 5.0 | ○ | ○ | ○ | ○ | 2 |
| Ex.31 | 5.4 | ○ | ○ | ○ | ○ | 2 |
| Ex.32 | 4.2 | ○ | ○ | ○ | ○ | 5 |
| C.Ex.18 | 6.6 | ○ | ○ | X | ○ | 2 |
| C.Ex.19 | 0.8 | X | X | ○ | ○ | 8 |
| C.Ex.20 | 5.6 | ○ | ○ | ○ | X | 800 |
| C.Ex.21 | 0.4 | XX | ◎ | ◎ | ○ | 2 |
| C.Ex.22 | 32.4 | ◎ | X | X | ○ | 2 |

Ex.: Example C.Ex.: Comparative Example

What is claimed is:

1. An aromatic polyamide film laminate comprising at least two biaxially oriented films formed of an aromatic polyamide, wherein:
   (1) a film layer A, which is an outermost surface layer on one side of the laminate, wherein the outermost surface layer forms protrusions on the outermost surface layer of film layer A and, which contains inorganic particles produced from hydroxides or carbonates of at least one metal of groups Ia and IIa of the periodic table, the inorganic particles having an average particle diameter of 80 to 1,500 nm and wherein the inorganic particles are contained in the polyamide film layer as a residue of a neutralizing agent in a step of polymerizing an aromatic polyamide, and said outermost surface layer has a surface roughness ($Ra^A$) of 1 to 20 nm; and
   (2) a film layer B, which is an outermost surface layer opposite to the layer A of the laminate, which has a surface roughness ($Ra^B$) of 0.1 to 10 nm and which contains substantially no particles or contains inorganic particles produced from hydroxides or carbonates of at least one metal of groups Ia and IIa of the periodic table, wherein the inorganic particles having an average particle diameter of 5 to 600 nm and wherein the inorganic particles are contained in the polyamide film layer as a residue of a neutralizing agent in a step of polymerizing an aromatic polyamide;
   (3) the surface roughness ($Ra^B$) of the film layer B being smaller than the surface roughness ($Ra^A$) of the film layer A by 1 nm or more.

2. The aromatic polyamide film laminate of claim 1, wherein the protrusions on the outermost surface of the film layer A have a density of about 1×10 to 1×10$^5$ per mm$^2$.

3. The aromatic polyamide film laminate of claim 1, wherein the outermost surface of layer B has protrusions and wherein the protrusions on the outermost surface of the film layer B have a density of about 1×10$^2$ to 1×10$^8$ per mm$^2$.

4. The aromatic polyamide film laminate of claim 1, wherein the film layer A contains inorganic particles having an average particle diameter of 90 to 1,200 nm and has a surface roughness ($Ra^A$) of 2 to 10 nm.

5. The aromatic polyamide film laminate of claim 1, wherein the outermost surface of film layer B has a surface roughness ($Ra^B$) of 0.1 to 5 nm.

6. The aromatic polyamide film laminate of claim 1, wherein the protrusions on the outermost surface of the film layer A have a density of about 5×10 to 1×10$^5$ per mm$^2$.

7. The aromatic polyamide film laminate of claim 1, wherein the film layer B contains substantially no particles or contains solid particles having an average particle diameter of 5 to 600 nm and has a surface roughness ($Ra^B$) of 0.1 to 10 nm.

8. The aromatic polyamide film laminate of claim 7, wherein the solid particles are inorganic particles produced from hydroxides or carbonates of at least one metal of the groups Ia and IIa of the periodic table.

9. The aromatic polyamide film laminate of claim 1, comprising a total Young's moduli in longitudinal and transverse directions of about 2,000 to 4,500 kg/mm$^2$.

10. The aromatic polyamide film laminate of claim 1, comprising an air-vent index of about 1 mmHg/hr or more.

11. The aromatic polyamide film laminate of claim 1, comprising a flexural rigidity in a longitudinal direction of about 3.0 to 9.5 mg·mm$^2$.

12. The aromatic polyamide film laminate of claim 1, comprising a tensile strength at break in a longitudinal direction of about 38 to 100 kg/mm.

13. The aromatic polyamide film laminate of claim 1, having a thermal shrinkage at 150° C. in an arbitrary direction of less than 1%.

14. The aromatic polyamide film laminate of claim 1, comprising a friction coefficient of about 0.6 or less.

15. The aromatic polyamide film laminate of claim 1, wherein the film layer B comprises a halogen ion content of about 50 ng/cm$^2$ or less.

16. The aromatic polyamide film laminate of claim 1, wherein the film layer B comprises an organic polar solvent content of about 50 ppm or less.

17. The aromatic polyamide film laminate of claim 1, wherein the film laminate has a thickness of about 0.1 to 20 μm.

18. The aromatic polyamide film laminate of claim 1, wherein the ratio of the thickness of the film layer A to that of the film layer B is 1:9 to 5:5.

19. The aromatic polyamide film laminate of claim 1, wherein the aromatic polyamide contains aromatic nuclei having para-orientation in a proportion of 50 to 99.5% of all the aromatic nuclei forming the main chain.

20. The aromatic polyamide film laminate of claim 1, wherein the aromatic polyamide comprises terephthalic acid as an acid component and p-phenylenediamine and 3,4'-diaminodiphenyl ether as diamine components.

21. A magnetic recording medium having a magnetic recording medium layer formed on the surface of the film layer B of the aromatic polyamide film laminate of claim 1.

22. A magnetic recording medium having a coated magnetic recording medium layer formed on the surface of the film layer B of the aromatic polyamide film laminate of claim 1.

23. A magnetic recording medium having a metal thin film magnetic recording medium layer formed on the surface of the film layer B of the aromatic polyamide film laminate of claim 1.

* * * * *